(12) United States Patent
Sawai et al.

(10) Patent No.: US 6,343,862 B1
(45) Date of Patent: Feb. 5, 2002

(54) PROJECTING IMAGE DISPLAY DEVICE

(75) Inventors: Yasumasa Sawai, Yamatotakada; Kohtaro Hayashi; Soh Ohzawa, both of Toyonaka; Yuichiro Ori, Moriyama; Jun Ishihara, Kobe, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/439,168

(22) Filed: Nov. 12, 1999

(30) Foreign Application Priority Data

Nov. 20, 1998 (JP) .......................................... 10-330379
Nov. 26, 1998 (JP) .......................................... 10-335581

(51) Int. Cl.[7] ..................... G02B 27/08; G03B 21/00; G03B 21/26; G03B 21/28; G03B 21/14
(52) U.S. Cl. ............................. 353/1; 359/616; 353/33; 353/34; 353/37; 353/38; 353/99; 349/8
(58) Field of Search ............................. 359/616; 353/1, 353/37, 33, 31, 34, 38, 98, 99; 349/5, 7, 8

(56) References Cited

U.S. PATENT DOCUMENTS

| | | | |
|---|---|---|---|
| 5,662,401 A | * 9/1997 | Shimizu et al. ............... | 353/38 |
| 5,737,113 A | 4/1998 | Kuramochi et al. ......... | 359/259 |
| 6,144,420 A | * 11/2000 | Jung .............................. | 349/8 |
| 6,155,685 A | * 12/2000 | Sawai et al. ................... | 353/30 |
| 6,278,500 B1 | * 8/2001 | Ogawa et al. .................. | 349/5 |

FOREIGN PATENT DOCUMENTS

| | | |
|---|---|---|
| JP | 06/202094 | 7/1994 |
| JP | 09-015626 | 1/1997 |
| JP | 09-318904 | 12/1997 |
| JP | 10-111472 | 4/1998 |

* cited by examiner

*Primary Examiner*—Russell Adams
*Assistant Examiner*—Magda Cruz
(74) *Attorney, Agent, or Firm*—Sidley Austin Brown & Wood

(57) ABSTRACT

A projecting image display device is disclosed which includes a display and a micro lens array, where the pixels of the display and the micro lens elements each have non symmetric properties in length and width directions. The micro lens concentrates color-separated light onto pixels of a display device so that light does not hit the black matrix. By providing a display having pixels which are not equal in length and width, pixels corresponding to red (R), green (G) and blue (B) can be arranged in a substantially square area, and by providing a micro lens array which has non symmetric properties in length and width, the color separated light can be concentrated onto the non square display pixels.

45 Claims, 12 Drawing Sheets

PROJECTING IMAGE DISPLAY DEVICE

RELATED APPLICATIONS

This application is based on applications No. 10-330379 and 10-335581 filed in Japan, the contents of which are hereby incorporated by reference.

FIELD OF THE INVENTION

The present invention pertains to a projecting image display device that displays images by modulating and projecting the light from a light source, and more particularly to a projecting image display device that first causes the light from the light source to form multiple light source images and then causes the light from these light source images to form an image in each pixel of the image display panel by means of a micro-lens array.

BACKGROUND OF THE INVENTION

Projecting image display devices that display images by modulating and projecting light from a light source are used as projecting televisions or data projectors. Generally, the light modulation is performed by means of a liquid crystal panel. A liquid crystal panel has a number of pixels that are aligned in a two-dimensional fashion, and performs light modulation by changing the polarization of the incident light by means of its pixels so that the distribution of polarization intensity changes. The change in polarization for each pixel is individually controlled based on the image signal. The amount of light of converted polarization varies among the pixels because the degree of polarization change is different from one pixel to another. By projecting the polarized light from the pixels, which differs in amount from one pixel to another, images are displayed that have different brightnesses but which taken together comprise a meaningful image.

It is preferred that a projecting image display device display images that are bright and have uniform brightness. However, the light modulated by a liquid crystal panel comprises only the light component having a plane of polarization aligned in a certain direction, and the light component having a plane of polarization perpendicular to this light component is not used for projection. Therefore, where light is directly supplied to the liquid crystal panel from a light source that emits light having various planes of polarization, images having only half the brightness of the capacity of the light source are displayed. In addition, because the light source generally comprises a lamp, which emits light from an essentially dot-like filament, and a reflector, and the light emitted from the lamp is reflected by the reflector to perform convergence, differences in intensity easily occur between the center and the peripheral areas of the light from the light source. Where this light is led to the liquid crystal panel as is, different areas on the liquid crystal panel receive different amounts of light, resulting in uneven brightness of the displayed image.

In order to modulate and project more of the light from the light source, light comprising light rays having random planes of polarization is separated into two light components having planes of polarization perpendicular to each other, and the polarization of one of the light components is changed so that the planes of polarization of both components matches, whereupon the light is led to the liquid crystal panel. In this way, all of the light emitted from the light source is used for modulation, and the brightness of the image doubles. Normally, the separation is carried out using a polarized beam splitter (PBS) that allows one of the two light components having perpendicular planes of polarization to pass through and reflect the other; the change in polarization is performed using a half-wavelength plate that rotates the plane of polarization by 90 degrees.

Additionally, an integrator is sometimes used in order to make the intensity distribution of the light supplied to the liquid crystal panel uniform, so that the light from the light source is formed into multiple light images and the light from the light source images is led to the entire screen of the liquid crystal panel. An integrator comprises two lens arrays. By using the lens cells of the first lens array, the integrator causes the light from the light source to form images on the corresponding lens cells of the second lens array, and leads the light from the multiple light sources to the entire screen of the liquid crystal panel. In this way, the light from the center of the light ray from the light source and the light in the peripheral areas of the light ray are supplied to all areas of the liquid crystal display in a mixed fashion. As a result, the differences in light amount received by different areas of the liquid crystal panel are eliminated, whereupon an image having a uniform brightness is displayed.

A construction is also used wherein a PBS array and a half-wavelength plate are incorporated into the integrator so that harmonization of light intensity and polarization change are carried out at the same time.

In a liquid crystal panel, it is necessary to divide the pixels in order to prevent the light from adjacent pixels from becoming intermixed, and circuit components such as TFT are used in order to drive each pixel. The area where these partitions and circuit components are located is called a 'black matrix', and each pixel is surrounded by a black matrix. Light does not enter a black matrix, and if it does enter it, it does not exit, such that the light entering the black matrix cannot be used for projection. This is another obstacle to improving image brightness.

Japanese Laid-Open Patent Application Hei 9-318904 proposes the use of a micro-lens array in front of the liquid crystal panel so that the light from the integrator is caused to strike the pixel openings only, without hitting the black matrix, in order to increase the efficiency of light utilization and improve the displayed image brightness. The device of this patent application is a single-panel projecting color image display device in which pixels to modulate the red (R), green (G) and blue (B) light are alternately located on a single liquid crystal panel, and the integrator is set such that it causes the R, G and B light to form images individually. One micro-lens cell is used for each group of three pixels, i.e., R, G and B pixels.

In one embodiment, the pixels have an essentially square configuration and the micro-lens cells have an essentially hexagonal configuration. Each micro-lens cell causes the light from the integrator to form images on the corresponding group of pixels and the pixels of its surrounding groups of pixels. In another embodiment, the pixels of the liquid crystal panel have a rectangular configuration and the micro-lens cells comprise cylindrical lenses having a length three times longer than the short sides of the pixels. The cylindrical lenses are located such that their widths are parallel to the short sides of the pixels. Each micro-lens cell causes the light from the integrator to form images on the group of pixels that it faces as well as on the groups of pixels located on either side of the first pixel group.

Generally, the pixels of a liquid crystal panel used for projecting image display devices have a size of at most 30 $\mu$m in order to increase image sharpness, and the F-number of the micro-lens cell that corresponds to this size is 20 or more. A micro-lens cell having such a large F-number has a poor image forming capability because of the effect of diffraction, resulting in a large blurred image. If the wavelength of light is λ the amount of blur <due to diffraction is <=λ×F. Therefore, using a micro-lens cell with an F-number of 20, the blur when using light having a wavelength of 400 to 700 nm (λ=400 to 700 nm) is <=8 to 14 μm. Therefore, where the size of the pixels is 14 μm or larger, the micro-lens cell can cause almost all of the light to strike the pixels.

However, in a single-panel projection color image display device, the pixels of the liquid crystal panel flat rectangular configuration and the R, G and B pixels are often stacked together such that their short sides are aligned. The length of the short sides is often approximately one-third of that of the long sides. Therefore, even if the long sides are 30 μm long, the short sides are about 10 μm, and a micro-lens cell having an F-number of 20 or more cannot cause all of the light to strike the pixels.

In a projecting image display device that causes the light to strike the screen diagonally, anamorphic projection, in which the vertical magnification by means of the projection lens is different from the horizontal magnification, is used so that the vertical and horizontal lengths of the image displayed will not look unnatural. Where anamorphic projection is used, the pixels of the liquid crystal panel usually have a flat configuration to correspond to the ratio of the vertical magnification to the horizontal magnification of the projection lens. In this case as well, if the short sides of the pixels are 14 μm or less, micro-lens cells having an F-number of 20 or larger cannot cause all of the light to strike the pixels.

Therefore, if micro-lens cells that cause the light to form images isotropically are used, as in the aforementioned Japanese laid-open patent application in which hexagonal micro-lens cells are used, the efficiency of light utilization in the liquid crystal panel having pixels with a flat configuration becomes low. Further, even with the micro-lens cell that causes the light to form images along the short sides of the pixels or vertically and is located such that it corresponds to one group of pixels stacked together such that their short sides are aligned, as in the cylindrical lenses of said patent application, the F-number cannot be made small and the efficiency of light utilization cannot be improved. Moreover, since this micro-lens cell does not have the capability to form images along the long sides of the pixels or horizontally, the light enters the black matrix between pixels aligned horizontally, which further reduces the light utilization efficiency of the liquid crystal panel.

In the Japanese Laid-Open Patent Applications Hei 9-318904 and Hei 10-111472, a construction is proposed in which light from multiple adjacent light sources enters micro-lens cells comprising the micro-lens array and each micro-lens cell causes the light from these light sources to form images on multiple adjacent pixels. Light from multiple light source images is supplied to one pixel by means of multiple micro-lens cells, whereby the amount of light received by each pixel becomes essentially the same.

A liquid crystal panel normally has a rectangular configuration in which its vertical and horizontal dimensions have a ratio of 3:4 or 9:16. The pixels of a liquid crystal panel are aligned in accordance with the desired quality of the displayed images, including the sharpness and the overlap of the three-color light components, which comprise color images, and therefore the ratio of the vertical pixel alignment pitch to the horizontal pixel alignment pitch does not match the ratio of the vertical side length to the horizontal side length of the liquid crystal panel.

In order to efficiently lead the light from the light source to the entire screen of the liquid crystal panel, the lens cells of the first lens array of the integrator must have essentially the same configuration as the liquid crystal panel, and the ratio of the vertical side to the horizontal side of the lens cells of the first lens array is set to be essentially identical to the ratio of the vertical side to the horizontal side of the liquid crystal panel. Therefore, the ratio of the vertical alignment pitch to the horizontal alignment pitch becomes equal to the ratio of the vertical side length to the horizontal side length of the liquid crystal panel. On the other hand, the micro-lens cells need to cause the light from the light sources formed by means of the integrator to form images on the pixels. In other words, the distribution of light source images on the liquid crystal panel must match the distribution of pixels.

However, because the ratio between the vertical alignment pitch and the horizontal alignment pitch of the first lens array lens cells is not the same as the ratio between the vertical alignment pitch and the horizontal alignment pitch of the pixels of the liquid crystal panel, if the optical axis of each lens cell of the first lens array is perpendicular to the surface of the array and the light from the light sources is made to form images on the optical axes, the distribution of the light sources thus formed does not match the distribution of the pixels. Therefore, in Japanese Laid-Open Patent Applications Hei 9-318904 and Hei 10-111472, the image forming position for the light that passes through each lens cell is made off-center by making each lens cell of the first lens array eccentric, so that the distribution of light source images will match the distribution of the pixels. The micro-lens array causes the light source images thus formed to re-form images on the liquid crystal panel without changes in distribution.

However, it is not easy to form eccentric lens cells. It takes a substantial amount of time to manufacture with sufficient precision a lens array having the desired degree of eccentricity. Consequently, if the conventional construction is used, it is difficult to improve the manufacturing efficiency for the lens array, leading to increase manufacturing costs. Moreover, it is not possible to use an optical system having a simple construction to replace the integrator as a means to form light sources that are aligned in a two-dimensional fashion.

Additionally, in the projecting image display devices in the Japanese Laid-Open Patent Applications referred to above, a transmission-type liquid crystal panel is used, and the micro-lens array is not designed to work with a reflective liquid crystal panel. In a reflective liquid crystal panel, the incident light and reflected light pass through the same light path, and therefore the micro-lens array located in front of the liquid crystal panel for the purpose of causing the light to form images on the pixels results in scattering of the reflected light. A projecting optical system having a relatively large diameter is required in order to cause the scattered reflected light to form images on the screen. Using the construction in which a conventional micro-lens array is used, it is practically impossible to display images by projecting light modulated by means of a reflective liquid crystal panel. This problem also occurs when a DMD (digital micro-mirror), which is also a reflective space modulating element, is used.

SUMMARY OF THE INVENTION

An object of the present invention is to provide an improved projecting image display device.

Another object of the present invention is to provide a projecting image display device that is capable of modulating all of the light from the light source and displaying images that are bright but which exhibits no unevenness in brightness, and that has a light modulating image display panel comprising pixels having a flat configuration.

Yet another object of the present invention is to provide a projecting image display device in which either a transmission-type or reflective image display panel may be used for the purpose of light modulation.

These objects described above are attained by means of a projecting image display device comprising a light source, a light source image forming optical system that causes the light from the light source to form multiple light source images, a liquid crystal panel that has a number of pixels aligned in a two-dimensional fashion and that modulates the light from the multiple light sources that strikes each pixel, a micro-lens array that has multiple micro-lens cells and that causes the light from the multiple light sources to form images on the pixels of the liquid crystal panel by means of each micro-lens cell, and a projecting optical system that projects the light modulated by the liquid crystal panel onto the screen, wherein each pixel of the liquid crystal panel has a flat configuration which is long in a first direction and short in a second direction perpendicular to the first direction, and wherein each micro-lens cell of the micro-lens array has a flat configuration which is long in the second direction and short in the first direction.

The objects described above are also attained by means of a projecting image display device comprising a light source, a light source image forming optical system that causes the light from the light source to form multiple light source images aligned in a two-dimensional fashion, a liquid crystal panel that has a number of pixels aligned in a two-dimensional fashion and that modulates the light from the multiple light source images that strikes each pixel, an image forming optical system that causes the light from the multiple light source images to form images on the pixels of the liquid crystal panel, and a projecting optical system that projects the light modulated by the liquid crystal panel onto the screen, wherein the light source image forming optical system forms multiple light source images such that the distribution of the light source images matches the distribution obtained by multiplying the distribution of the pixels of the liquid crystal panel using different magnifications for the two sides perpendicular to each other and wherein the image forming optical system comprises two cylindrical lens arrays that have different focal lengths and that form images on planes that are perpendicular to each other, said image forming optical system causing the light from the multiple light source images to form images such that the resulting images have a distribution matching the distribution of the pixels of the liquid crystal.

BRIEF DESCRIPTION OF THE DRAWINGS

A more complete understanding of the present invention and its advantages will be readily apparent from the following Detailed Description taken in conjunction with the accompanying drawings.

DETAILED DESCRIPTION OF THE PREFERRED EMBODIMENTS

The embodiments of the projecting image display device (hereinafter simply referred to as the 'projecting image display device') pertaining to the present invention are explained below with reference to the drawings.

Flat micro-lens embodiment

Figures 1, 2:
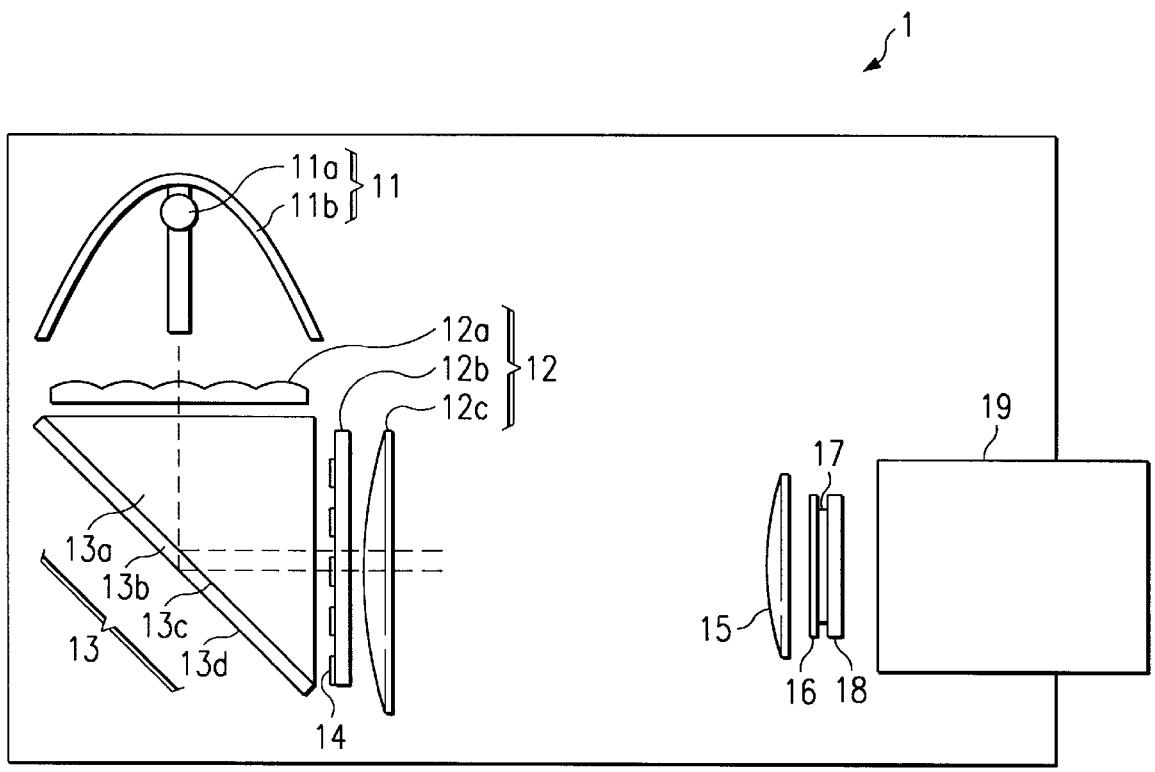
FIG. 1 is a drawing showing the construction of the optical systems of the projecting image display device pertaining to a first embodiment.
FIG. 2 is a drawing showing the distribution of the light source images formed by means of the integrator of the projecting image display device pertaining to the first embodiment.

The construction of the optical systems of the projecting image display device 1 according to a first embodiment is shown in FIG. 1. The projecting image display device 1 comprises a single-panel color image display device that modulates the R light, G light and B light by means of a single liquid crystal panel. The projecting image display device 1 comprises a light source 11, an integrator 12, a PBS prism 13, half-wavelength plates 14, a field lens 15, a diffraction grating 16, a micro-lens array 17, a transmission-type liquid crystal panel 18 and a projecting optical system 19. The liquid crystal panel 18 has a rectangular configuration with a 4:3 ratio between the long side length and the short side length.

The light source 11 comprises a metal halide lamp 11a and a parabolic reflector 11b. The lamp 11a emits white light that has random planes of polarization and includes all wavelengths in the visible range. The lamp 11a is located on the focal point of the reflector 11b, which reflects the light emitted by the lamp 11a much that the light reflected by the reflector 11b becomes parallel light rays.

The integrator 12 comprises first and second lens arrays 12a and 12b, each comprising multiple lens cells aligned in a two-dimensional fashion, and a superposing lens 12c. Specifically, the first lens array 12a has five lens cells along the side that corresponds to the long side of the liquid crystal panel 18 and eight lens cells along the side that corresponds to the short side of the liquid crystal panel 18. The second lens array 12b has ten lens cells along the side that corresponds to the long side of the liquid crystal panel 18 and eight lens cells along the side that corresponds to the short side of the liquid crystal panel 18. One pair of adjacent lens cells of the lens array 12b corresponds to one lens cell of the lens array 12a.

Each lens cell of the first lens array 12a causes the light from the light source 11 to form an image on the corresponding lens cell of the second lens array 12b. A light source image is formed on each lens cell of the second lens array 12b, such that the lens array 12b becomes a planar secondary light source in which multiple light source images are aligned in a two-dimensional fashion. The superposing lens 12c leads the light from the light source on each lens cell of the second lens array 12b to the entire surface of the liquid crystal panel 18.

In other words, the first lens array 12a and the liquid crystal panel 18 are essentially conjugate to each other and the second lens array 12b and the light source 11 are essentially conjugate to each other. The light from the light source 11 that strikes each lens cell of the first lens array 12a is first made to form individual light source images and is then superposed on the liquid crystal panel 18. Incidentally, it is possible to include the function of the superposing lens 12c in the lens cells of the lens array 12b and eliminate the superposing lens 12c.

The PBS prism 13 comprises a triangular prism 13a, the cross-section of which has a right isosceles triangle configuration, and a parallel flat panel 13b that is adhered to the slanted surface of the prism. A PBS film 13c that allows the P-polarized light to pass through and reflects the S-polarized light is formed on the surface of the flat panel 13b that is in contact with the prism 13a, and the other surface of the flat panel 13b comprises a total reflection surface 13d. The lens arrays 12a and 12b of the integrator 12 are located such that they each face one of the two surfaces of the prism 13a that are perpendicular to each other.

Light from the light source 11 that passes through the lens cells of the first lens array 12a and strikes the PBS film 13c and separates into differently polarized light components, because the S-polarized light included in the light is reflected by the PBS film 13c while the P-polarized light passes through the PBS film 13c. The S-polarized light reflected by the PBS film 13c strikes one of the two lens cells of each pair in the second lens array 12b and forms images. The P-polarized light that passes through the PBS film 13c is reflected by the total reflection surface 13d strikes the other lens cell of each pair in the second lens array 12b and forms images.

The half-wavelength plates 14 are located on the PBS prism 13 side of the lens array 12b such that they correspond to the lens cells which the P-polarized light strikes. The half-wavelength plates 14 convert the incident P-polarized light into S-polarized light, and therefore, all of the light that strikes the lens array 12b, i.e., the light that exits the integrator 12, becomes S-polarized light.

FIG. 2 shows the distribution of the light source images on the second lens array 12b. The light from the light source 11 forms an image in the center of each lens cell of the lens array 12b, whereby multiple light source images are formed. In FIG. 2, the light source images indicated by solid lines are those formed by the original S-polarized light and the light source images indicated by dotted lines are those formed by the S-polarized light that was obtained through the conversion from P-polarized light by means of the half-wavelength plates 14.

The liquid crystal panel 18 has a rectangular configuration. As described below, groups of pixels, each of which modulates the light to express one point of an image, are aligned at an equal pitch along both the long side and the short side of the liquid crystal panel. The lens cells of the lens array 12a are formed in an eccentric fashion, so that the light source images may also be aligned on the lens array 12b at the same pitch along the long side and the short side of the lens array 12b in response to the alignment pitch of the pixels, and each lens cell of the lens array 12b is square. By matching the light source image distribution to the pixel group distribution, the light from the light source images may be efficiently led to strike the pixels.

The field lens 15 adjusts the light from the lens array 12b to become essentially perpendicular to the liquid crystal panel 18 so that all of the light passing through the liquid crystal panel 18 enters the projecting optical system 19. The diffraction grating 16 diffracts the white light from the lens array 12b that passes through the field lens 15 and breaks it down into three-color light components, i.e., R, G and B.

The micro-lens array 17 causes the light incident thereon to form images on the liquid crystal panel 18. In other words, the second lens array 12b of the integrator 12 and the liquid crystal panel 18 are essentially conjugate to each other. The three color light components, R, G and B, obtained through the breaking down of the light performed by the diffraction grating 16, progress in directions slightly different from one another due to the differences in their angles of diffraction, and are caused to form images on different pixels of the liquid crystal panel 18 by means of the micro-lens array 17.

The projecting optical system 19 projects the light which passes through and is modulated by the pixels of the liquid crystal panel 18 onto, for instance, a screen which not shown in the drawing. The projected light forms images on the screen, displaying a color image.

Figure 3:
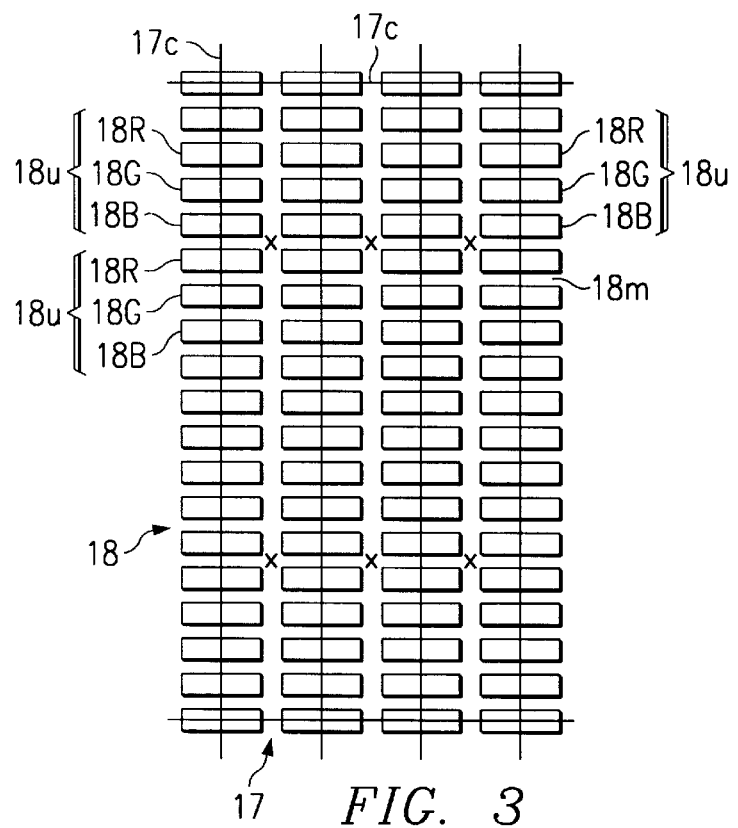
FIG. 3 is a drawing showing a part of the micro-lens array and the liquid crystal panel of the projecting image display device pertaining to the first embodiment.

FIG. 3 shows a part of the micro-lens array 17 and the liquid crystal panel 18. The liquid crystal panel 18 comprises three different types of pixels 18R, 18G and 18B, aligned in a two-dimensional fashion, to modulate the R light, G light and B light, respectively, wherein there are multiple pixels of each of 18R, 18G and 18B.

Each of the pixels 18R, 18G and 18B has a color filter that selectively allows R, G or B light to pass through but does not allow the other two types of light to pass through. The pixels 18R, 18G and 18B each have a flat rectangular configuration whose longer side length is approximately 30 $\mu$m and short side length is approximately 10 $\mu$m, and which are located so that the long sides and the short sides of the multiple pixels are aligned with each other. A black matrix 18m exists around the pixels 18R, 18G and 18B.

The three types of pixels 18R, 18G and 18B are aligned in this sequence such that they are stacked on top of one other along their short sides. The pixels aligned along their long sides comprise identical pixels 18R, 18G or 18B that modulate the same color light. Three pixels 18R, 18G and 18B which are stacked on top of one other along their short sides together modulate the light that expresses one point of an image. Thus, a group of three adjacent pixels stacked along their short sides will hereinafter be called a pixel unit 18u. The pixel unit 18u has a square configuration having sides each with a length of approximately 30 $\mu$m. The horizontal alignment pitch (along the long sides of the pixels) for the pixel units 18u and the vertical alignment pitch (along the short sides of the pixels) are the same.

The micro-lens array 17 comprises multiple micro-lens cells 17c aligned in a two-dimensional fashion. Each micro-lens cell 17c has a flat rectangular configuration with a long side length of approximately 90 $\mu$m and a short side length of approximately 30 $\mu$m. Thus, the shape of the micro-lens cell 17c is essentially similar to that of the pixels 18R, 18G or 18B, and the micro-lens cell is equal in size to three pixel units 18u. The vertical curvature of the lens surface of each micro-lens cell 17c (along the long side of the micro-lens cell) is the same as the horizontal curvature (along the short side of the micro-lens cell), and each micro-lens cell 17c has an isotropic image forming capability.

The micro-lens array 17 is located such that the long sides of the micro-lens cells 17c are parallel to the short sides of the pixels of the liquid crystal panel 18. In addition, in response to the fact that the distribution of the light source images formed on the second lens array 12b matches the distribution of the pixel units 18u of the liquid crystal panel 18 and that the second lens array 12b has an even number of lens cells both vertically (along the short sides of the pixels) and horizontally (along the long sides of the pixels), the micro-lens array 17 is located such that the optical axes of the micro-lens cells 17c pass through the centers of four adjacent pixel units 18u (shown with crosses in FIG. 3). Therefore, one micro-lens cell faces six pixel units in such a way that half of each of the six pixels is covered by the micro-lens cell.

Figure 4:
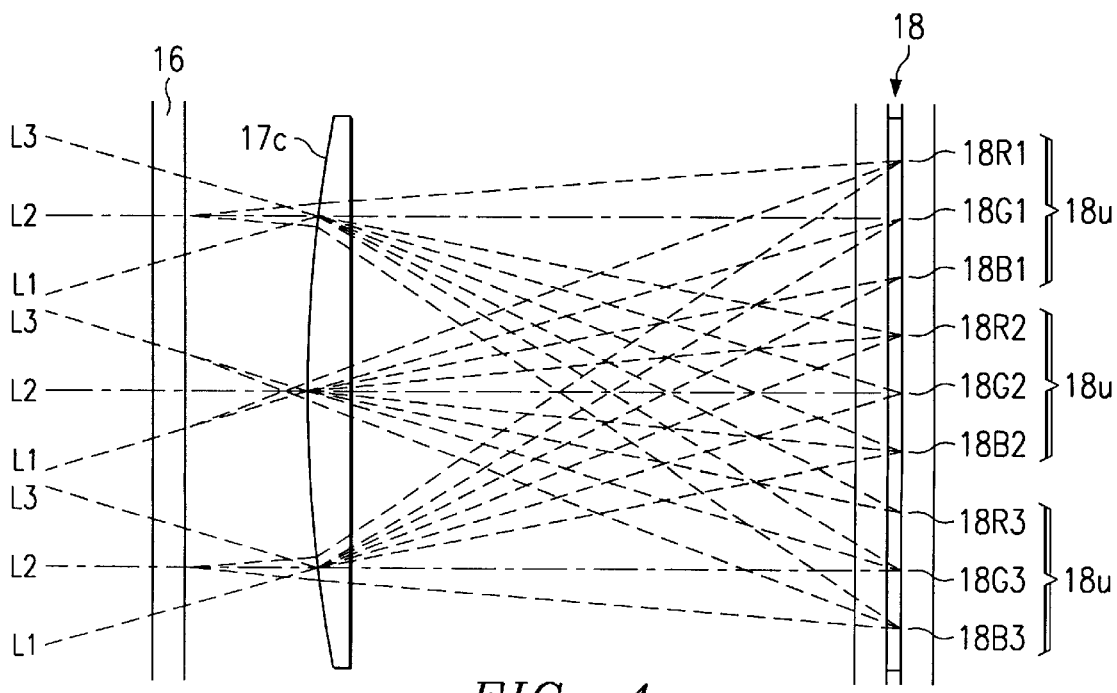
FIG. 4 is a drawing showing, in a simplified fashion, how chromatic breakdown of the light is performed by means of the diffraction grating and how the light is caused to form images on the liquid crystal panel by means of the micro-lens cells in the projecting image display device pertaining to the first embodiment.

FIG. 4 shows in a simplified fashion the manner in which the diffraction grating 16 performs chromatic breakdown of the light as well as the manner in which the light forms images on the liquid crystal panel 18 by means of the micro-lens cells 17c. FIG. 4 shows the system seen from the long side of the micro-lens cell 17c. The light from all of the lens cells of the second lens array 12b strikes the micro-lens cell 17c, but in order to avoid making the drawing too complex, only the light rays L1, L2 and L3 from three adjacent lens cells of the lens array 12b are shown. The light rays L1, L2 and L3 are from the lens cells C4, C3 and C2, respectively, in FIG. 2 for example. In addition, in order to distinguish pixels 18R, 18G and 18B of one pixel unit 18u from those of another pixel unit, the number 1, 2 or 3 is added at the end.

The light ray L1 from one lens cell of the lens array 12b is broken down by the diffraction grating 16 into R, G and B light rays before it strikes the micro-lens cell 17c. Passing through the micro-lens cell 17c, the R, G and B light rays form images on three adjacent pixels 18R1, 18G1 and 18B1, respectively, of the liquid crystal panel 18.

The R, G and B light rays that are generated through the chromatic breakdown of the light rays L2 from the adjacent lens cell respectively form images on the pixels 18R2, 18G2 and 18B2 that are each three pixels away from the pixel on which the R, G or B light ray originating from the light rays L1 forms an image. Further, the R, G and B light rays generated through the chromatic breakdown of the light L3 from the next adjacent lens cell respectively form images on the pixels 18R3, 18G3 and 18B3 that are each six pixels away from the pixel on which the R, G or B light rays originating from the light L1 form an image.

As described above, one micro-lens cell 17c causes the light from the light source images aligned vertically (along the short sides of the pixels) to form images such that the image formation by means of the light from one light source image takes place on one pixel unit 18u, the image formation by means of the light from the next light source image takes place on the next pixel unit 18u, and so forth in the vertical direction (along the short sides of the pixels). Because the vertical arrangement of the micro-lens cells 17c (along the short sides of the pixels) is such that one micro-lens cell covers three pixel units 18u, each pixel unit 18u receives the light from every three light source images aligned in one vertical line of the lens cell array 12b.

While not shown in the drawings, one micro-lens cell 17c causes the light from the light source images aligned horizontally (along the long sides of the pixels) to form images such that the image formation by means of the light from one light source image takes place on one pixel unit 18u, the image formation by means of the light from the next light source image takes place on the next pixel unit 18u, and so forth in the horizontal direction (along the long sides of the pixels). Because the horizontal arrangement of the micro-lens cells 17c (along the long sides of the pixels) is such that one micro-lens cell covers one pixel unit 18u, each pixel unit 18u receives the light from all light sources aligned in one horizontal line of the lens cell array 12b.

Since the ratio of the long side (vertical side) length to the short side (horizontal side) length of the micro-lens cell 17c is approximately 3:1, the F-number of the micro-lens cell for the horizontal direction is approximately one third of the F-number for the vertical direction. Accordingly, the degree of vertical blur of the light made to form an image by means of the micro-lens cell 17c is approximately one-third the degree of horizontal blur. The long side of the micro-lens cell is parallel to the short sides of the pixels 18R, 18G and 18B, meaning that the direction for which the degree of blur is smaller is parallel to the short sides of the pixels. Therefore, while the image formation capability of the micro-lens cell 17c is isotropic, the light may be easily caused to form an image only within each pixel.

Specifically, the horizontal (along the short side of the micro-lens cell) F-number of the micro-lens cell 17c is set to be approximately 20, which is the same as in conventional models, and the vertical (along the long side of the micro-lens cell) F-number is approximately 6.7. Therefore, the degree of blur of the visible light caused to form an image by means of the micro-lens cell 17c is in the range of 8 to 14 μm along the long side of the pixel and in the range of 2.7 to 4.7 μm for the short side of the pixel, whereupon visible light of any wavelength may be contained within the pixel, whose long side is approximately 30 μm long and the short side is approximately 10 μm long. Consequently, no light enters the black matrix 18m outside the pixels 18R, 18G or 18B, enabling all of the light to be used for modulation and projection.

The micro-lens cells 17c and the pixels of the liquid crystal panel 19 have similar configurations, and the ratio of the long side length to the short side length (hereinafter the 'flatness') is about the same for the micro-lens cells and the pixels. Since the vertical (along the short side of the pixel) blur may be reduced by making the long sides of the micro-lens cells 17c parallel to the short sides of the pixels of the liquid crystal panel 18, it is not necessary to have the flatness of the micro-lens cells 17c be identical to that of the pixels. However, if the flatness of the micro-lens cells 17c and the flatness of the pixels are made approximately identical, the ratio of the horizontal (along the long side of the pixel) blur to the vertical (along the short side of the pixel) blur may be made to be about the same as the ratio of the long side length to the short side length of the pixel.

In this way, even if the F-number of the micro-lens cell is made slightly larger, it is possible to have the light form an image of the appropriate size both horizontally (along the long side of the pixel) and vertically (along the short side of the pixel). For example, where the pixels 18R, 18G and 18B of the liquid crystal panel 18 are made small in order to increase the sharpness of the images displayed, and if the micro-lens cell 17c is made accordingly small and its F-number increases, simply by setting the F-number so that the light is contained along the long side or the short side of the pixel, the light can be reliably contained along the other side as well.

If the micro-lens cells 17c were located such that one micro-lens cell 17c corresponded to one pixel unit 18u, the light from all light image sources would be supplied to all pixel units 18u and there would be no differences in the amount of light received by the pixel units 18u. However, in the projecting image display device 1 in which one micro-lens cell 17c corresponds to three pixel units 18u, the light from every three light source images is supplied to each pixel unit 18u as described above. In addition, the amount of light that strikes the integrator 12 from the light source 11 varies from the center to the periphery of the light source, and the amount of light that strikes the second lens array 12b varies among its lens cells. Consequently, the amount of light received varies slightly among the pixel units Table 1 shows the relative intensity of the light that strikes each lens cell of the second lens array 12b when the size of the lens cells of the first lens array 12a is 14.2×8.8 mm when the light source 11 and the integrator 12 of the construction described above are used. The codes A through J and 1 through 8 in Table 1 correspond to the codes in FIG. 2.

TABLE 1

| | A | B | C | D | E | F | G | H | I | J |
|---|---|---|---|---|---|---|---|---|---|---|
| 1 | 0.01 | 0.01 | 0.01 | 0.01 | 0.02 | 0.02 | 0.01 | 0.01 | 0.01 | 0.01 |
| 2 | 0.01 | 0.01 | 0.02 | 0.02 | 0.03 | 0.03 | 0.02 | 0.02 | 0.01 | 0.01 |
| 3 | 0.02 | 0.02 | 0.04 | 0.04 | 0.07 | 0.07 | 0.04 | 0.04 | 0.02 | 0.02 |
| 4 | 0.02 | 0.02 | 0.06 | 0.06 | 0.12 | 0.12 | 0.06 | 0.06 | 0.02 | 0.02 |
| 5 | 0.02 | 0.02 | 0.06 | 0.06 | 0.12 | 0.12 | 0.06 | 0.06 | 0.02 | 0.02 |
| 6 | 0.02 | 0.02 | 0.04 | 0.04 | 0.07 | 0.07 | 0.04 | 0.04 | 0.02 | 0.02 |
| 7 | 0.01 | 0.01 | 0.02 | 0.02 | 0.03 | 0.03 | 0.02 | 0.02 | 0.01 | 0.01 |
| 8 | 0.01 | 0.01 | 0.01 | 0.01 | 0.02 | 0.02 | 0.01 | 0.01 | 0.01 | 0.01 |

The pixel units 18u of the liquid crystal panel 18 may be divided into a first group that receives the light from the lens cells A1 through J1, A4 through J4 and A7 through J7, a second group that receives the light from the lens cells A2 through J2, A5 through J5 and A8 through J8, and a third group that receives the light from the lens cells A3 through J3 and A6 through J6. Calculating the amount of light received by the pixel units 18u from the intensity shown in Table 1, the amounts of light received by the first and second groups are each 1.13 times the amount received by the third group, representing a minimal difference.

For comparison, a construction is considered in which the vertical blur (along the short side of the pixel) is made identical to that in the projecting display device 1 by means of square micro-lens cells. In this case, one micro-lens cell corresponds to three pixel units 18u not only vertically (along the short side of the pixel) but also horizontally (along the long side of the pixel), and therefore, the first through third groups will further be divided into three more groups. For example, the first group will be divided into a group that receives the light from lens cells A1, A4, A7, D1, D4, D7, G1, G4, G7, J1, J4 and J7, a group that receives the light from lens cells A2, A5, A8, D2, D5, D8, G2, G5, G8, J2, J5 and J8, and a group that receives the light from lens cells A3, A6, D3, D6, G3, G6, J3 and J6.

Calculating from the intensity shown in Table 1, the maximum amount of light received in the nine groups is 1.25 times larger than the minimum amount. The variation in the amount of received light among the pixel units is as much as twice that in the projecting image display device 1, resulting in increased unevenness in the brightness of the displayed images.

In the projecting image display device 1 in which micro-lens cells 17c having a flat configuration are located such that their long sides are parallel to the short sides of the pixels, the light may be reliably contained within the pixels. It is therefore not necessary to make the micro-lens cells have a non-flat configuration in order to further reduce the horizontal blur (along the long side of the pixel). Making the micro-lens cells non-flat does not contribute to the effective use of the light and is therefore not particularly meaningful. It is in fact undesirable because it would increase the unevenness of the image brightness as described above.

The projecting image display device 1 of this embodiment comprises a single-panel color image display device, and in order to make the pixel unit 18u be essentially square, the flatness of the pixels of the liquid crystal panel 18 and the micro-lens cells 17c is set to be approximately 3, but their flatness is not limited to this ratio only. In addition, while the short side of one micro-lens cell 17c covers one pixel unit, it is also acceptable if the short side of one micro-lens cell 17c covers multiple pixel units, so long as that does not create large variations in the amount of light received by the pixels.

For example, the long side of the pixel may be twice as long as the short side, the short side of the micro-lens cell may be twice as long as the long side of the pixel, and the long side of the micro-lens cell may be nine times as long as the short side of the pixel. In this case, the short side of the micro-lens cell covers two pixel units, but no large variations occur in the amount of light received by the pixels. Here, the flatness of the pixel becomes 2 and the flatness of the micro-lens cell becomes 2.25. As another example, the long side of the pixel and the short side of the micro-lens cell may remain the same as in this embodiment while the length of the long side of the micro-lens cell is six times that of the short side of the pixel, such that the long side of the micro-lens cell covers two pixel units. In this case, the variation in the amount of light received by the pixels decreases further. The flatness of the pixel becomes 3 and the flatness of the micro-lens cell becomes 2.

Figure 5:
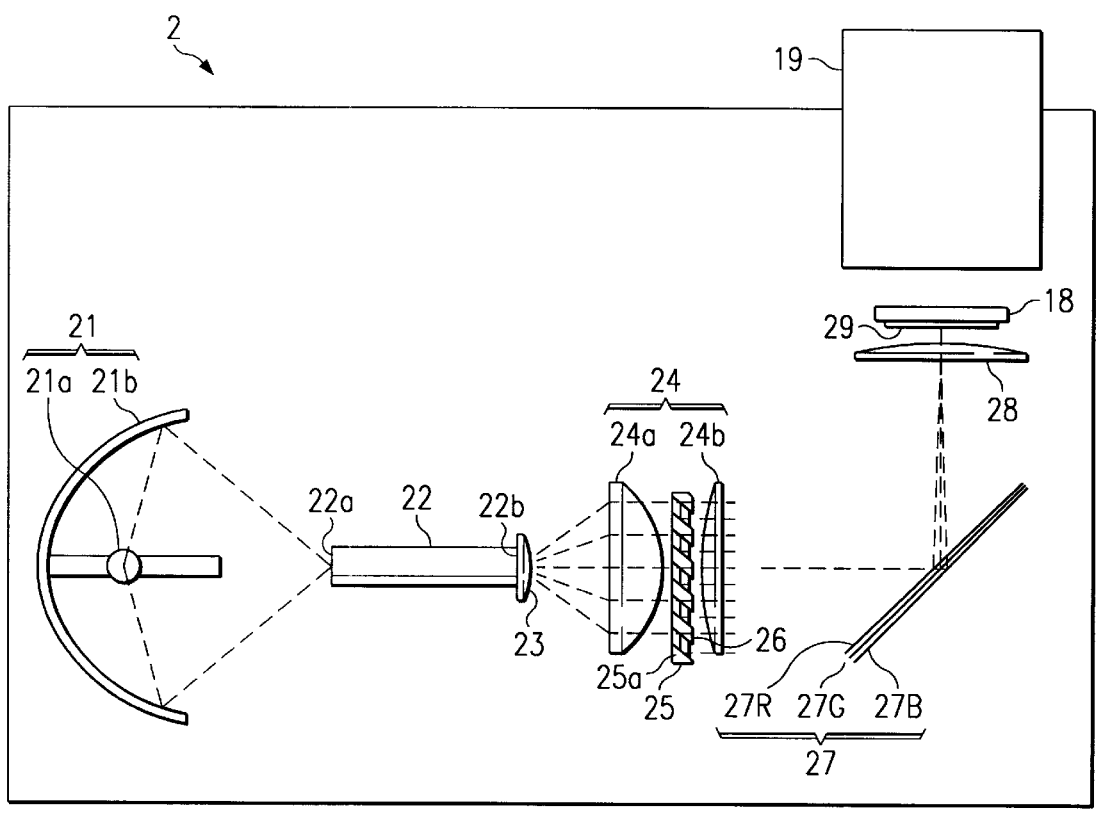
FIG. 5 is a drawing showing the construction of the optical systems of the projecting image display device pertaining to a second embodiment.

FIG. 5 shows the construction of the optical systems of the projecting image display device 2 comprising a second embodiment. This projecting image display device 2 also comprises a single-panel color image display device that modulates the R, G and B light by means of a single liquid crystal panel. The projecting image display device 2 has a light source 21, a kaleidoscope 22, a condenser lens 23, a relay optical system 24, a PBS prism array 25, half-wavelength plates 26, dichroic mirrors 27, a field lens 28, a micro-lens array 29, a transmission-type liquid crystal panel 18 and a projecting optical system 19. The liquid crystal panel 18 and the projecting optical system 19 are identical to those used in the projecting image display device 1 of the first embodiment.

The light source 21 comprises a metal halide lamp 21a and an ellipsoidal reflector 21b. The lamp 21a emits white light that has random planes of polarization and includes all wavelengths in the visible range. The lamp 21a is located on the first focal point of the reflector 21b such that the reflector 21b reflects the light emitted by the lamp 21a and causes it to converge onto the second focal point.

The kaleidoscope 22 has a rectangular cross-section having a 4:3 ratio between the side corresponding to the long side of the liquid crystal panel 18 and the side corresponding to the short side of the liquid crystal panel 18. The light entry plane 22a of the kaleidoscope 22 is located on the second focal point of the reflector 21b and is essentially conjugate with the lamp 21a. The light from the lamp 21a forms an image in the center of the light entry plane 22a and enters the kaleidoscope efficiently. All of the light entering the kaleidoscope 22 is repeatedly reflected inside the kaleidoscope 22, and exits from the light exit plane 22b with an even light distribution.

The condenser lens 23 causes the light leaving the kaleidoscope 22 to form images on the pupil plane of the relay optical system 24. The light entry plane of the kaleidoscope 22 is essentially conjugate with the pupil plane of the relay optical system 24. Multiple light source images are formed at the positions on the pupil plane of the relay optical system 24 that correspond to the number of reflections inside the kaleidoscope 22.

The relay optical system 24 comprises two convex lenses 24a and 24b, and the lens 24a, which is located on the light entry side, makes the light from the kaleidoscope 22 parallel when it travels from the lens 24a to the lens 24b. An aspherical lens is used for the entry side lens 24a in order to increase the degree of parallelism of the light. The light exit plane 22b of the kaleidoscope 22 is essentially conjugate with the liquid crystal panel 18 relative to the relay optical system 24 and because the cross-section of the kaleidoscope 22 is similar in shape to the liquid crystal panel 18, the light is efficiently led to the liquid crystal panel 18 in a uniform fashion.

The pupil of the relay optical system 24 is located between the lens 24a and the lens 24b, and the secondary light source images formed by means of the condenser lens 23 are formed on the pupil plane between the lenses 24a and 24b. The PBS prism array 25 is located on the pupil plane of the relay optical system 24. Belt-like PBS films 25a that allow the P-polarized light to pass through but reflect the S-polarized light are located on the PBS prism array 25. The PBS films 25a are located such that they are angled by 45 degrees relative to the optical axis of the relay optical system 24 and are parallel to and equidistant from one another. The half-wavelength plates 26 are located on the lens 24b side of the PBS prism array 25 such that they face every alternate PBS film 25a.

The light that passes through the entry side lens 24a of the relay optical system 24 forms images on the PBS prism array 25 and is also separated into P-polarized light that passes through the PBS films 25a and S-polarized light that is reflected by them. The P-polarized light that passes through the PBS films 25a strikes the half-wavelength plates 26. While passing through the half-wavelength plates 26, the P-polarized light is converted into S-polarized light and strikes the lens 24b. On the other hand, the S-polarized light reflected by the PBS films 25a is reflected by the adjacent PBS films 25a again and strikes the lens 24b after passing in between the half-wavelength plates 26. Therefore, all of the light that exits the relay optical system 24 becomes S-polarized light.

In this embodiment as well, in which multiple light source images are formed by means of a kaleidoscope 22, the need for a large prism is eliminated and the device may be made small and lightweight by combining a relay optical system 24 and a PBS prism array 25 in this manner. Moreover, the uniformity and efficiency of use of the light led to the liquid crystal panel 18 are the same as in the first embodiment which is equipped with an integrator 12.

Figure 6:
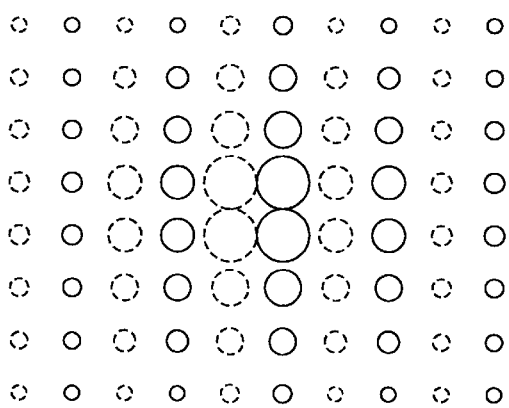
FIG. 6 is a drawing showing the distribution of light source images formed by the kaleidoscope and the condenser lens of the projecting image display device pertaining to the second embodiment.

FIG. 6 shows the distribution of the light source images originating from the light source 21, which are formed on the PBS prism array 25. In FIG. 6, the light source images indicated using solid lines are formed by S-polarized light while the light source images indicated by dotted lines are formed by P-polarized light. The light from the latter light source images is later converted into S-polarized light. Because the cross-section of the kaleidoscope 22 has a rectangular configuration with a 4:3 ratio between the sides, similar to the liquid crystal panel 18, and separation of the polarized light components takes place along the long side of the cross-section of the kaleidoscope 22 by means of the PBS prism array 25, the ratio of the light source image alignment pitch along the side corresponding to the long side of the liquid crystal panel 18 to the pitch along the side corresponding to the short side of the liquid crystal pane 18 is 2:3.

The dichroic mirrors 27 include three dichroic mirrors 27R, 27G and 27B that have slight differences in their angle relative to the incident light. The dichroic mirrors 27R, 27G and 27B selectively reflect the R, G and B light, respectively, and allow light of other colors to pass through. The white light that strikes the dichroic mirrors 27 from the relay optical system 24 is broken down into R, G and B light by each of the mirrors, and because the mirrors are positioned at slightly different angles, the separated R, G and B light components are each reflected in slightly different directions.

The field lens 28 causes the light from the dichroic mirrors 27 to travel essentially perpendicular to the liquid crystal panel 18 so that all the light passing through the liquid crystal panel 18 will enter the projecting optical system 19. The micro-lens array 29 causes the incident light to form images on the liquid crystal panel 18. In other words, the pupil plane of the relay optical system 24 and the liquid crystal panel 18 are essentially conjugate with each other. The three color light components, i.e., R, G and B, obtained after the white light is broken down by the dichroic mirrors 27, travel in directions slightly different from one another because of the differences in their reflection angles, and are caused to form images on different pixels on the liquid crystal panel 18 by means of the micro-lens array 29.

The liquid crystal panel 18 comprises pixel units 18u, each of which comprises three pixels 18R, 18G and 18B having long sides of approximately 30 μm and short sides of approximately 10 μm, as explained with reference to FIG. 3, aligned in a two-dimensional fashion, wherein there are multiple pixels 18R, 18G and 18B. The pixel units 18u are aligned at equal pitches horizontally and vertically (along the long sides and the short sides of the pixels), and the distribution of the pixel units 18u is different from the distribution of the light source images shown in FIG. 6.

In order to correct the difference in their distributions and lead the light from the light source images to the pixel units 18u efficiently, the micro-lens cells of the micro-lens array 29 have an anisotropic image forming capability, unlike the micro-lens cells 17c of the projecting image display device 1. However, the micro-lens cells have a flat rectangular configuration with an approximately 3:1 ratio between the long side length and the short side length, and are located such that their long sides are parallel to the short sides of the pixels of the liquid crystal panel 18 and their optical axes pass through the centers of pixel unit groups comprising four adjacent pixel units 18u in the same manner as with the micro-lens cells 17c.

Figure 7:
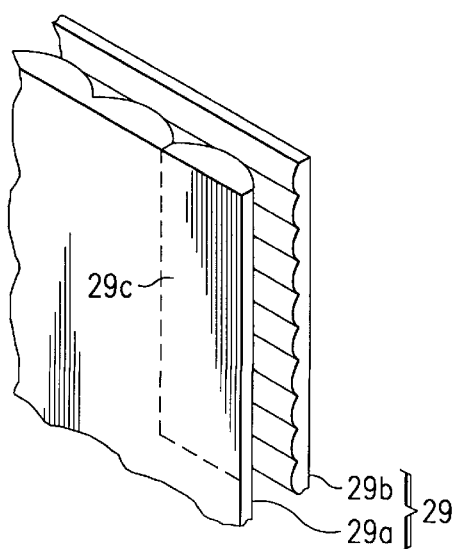
FIG. 7 is a drawing showing the micro-lens array of the projecting image display device pertaining to the second embodiment.

FIG. 7 shows the micro-lens array 29. The micro-lens array 29 comprises two cylindrical lens arrays 29a and 29b. The lens arrays 29a and 29b are located such that the cylindrical lenses of one array are perpendicular to the cylindrical lenses of the other array. The width of each cylindrical lens of the lens array 29a is approximately 30 μm, essentially that of the long side of the pixel 18R, 18G or 18B of the liquid crystal panel 18. The width of each cylindrical lens of the lens array 29b is approximately 10 μm, essentially that of the short side of the pixel.

The area at which a section of one cylindrical lens of the lens array 29a faces a section of the nine cylindrical lenses of the lens array 29b comprises one micro-lens cell 29c of the micro-lens array 29. The micro-lens array 29 is situated such that widths of the cylindrical lenses of the lens array 29a are parallel to the long sides of the pixels of the liquid crystal panel 18 and the widths of the cylindrical lenses of the lens array 29b are parallel to the short sides of the pixels, and such that the lens array 29b is closer to the liquid crystal panel 18.

The focal lengths of the cylindrical lenses of the lens array 29a and the cylindrical lenses of the lens array 29b are set such that the ratio between the light source image alignment pitch corresponding to the direction of alignment of the long side of the pixel travels and the alignment pitch corresponding to the direction of alignment of the short side of the pixel travels will be corrected from 2:3 to 1:1 on the liquid crystal panel. Consequently, the difference in the light source image distributions is corrected such that the light source image distribution matches the distribution of the pixel units 18u and the light may be efficiently led to the pixels.

The light is caused to form images on the pixels by means of the micro-lens cells 29c in the same manner shown in FIG. 4. Because the image forming capability of the micro-lens cells 29c is anisotropic, the ratio between the F number for the vertical direction (along the long side of the micro-lens cell) and the F number for the horizontal direction (along the short side of the micro-lens cell) is not the same as the ratio between the long side length and the short side length of the micro-lens cell. However, the F number for the vertical direction is smaller than the F number for the horizontal direction and the vertical blur is smaller than the horizontal blur. Therefore, the micro-lens cells 29c can reliably cause the light to form images within each pixel of the liquid crystal panel 18.

Figure 8:
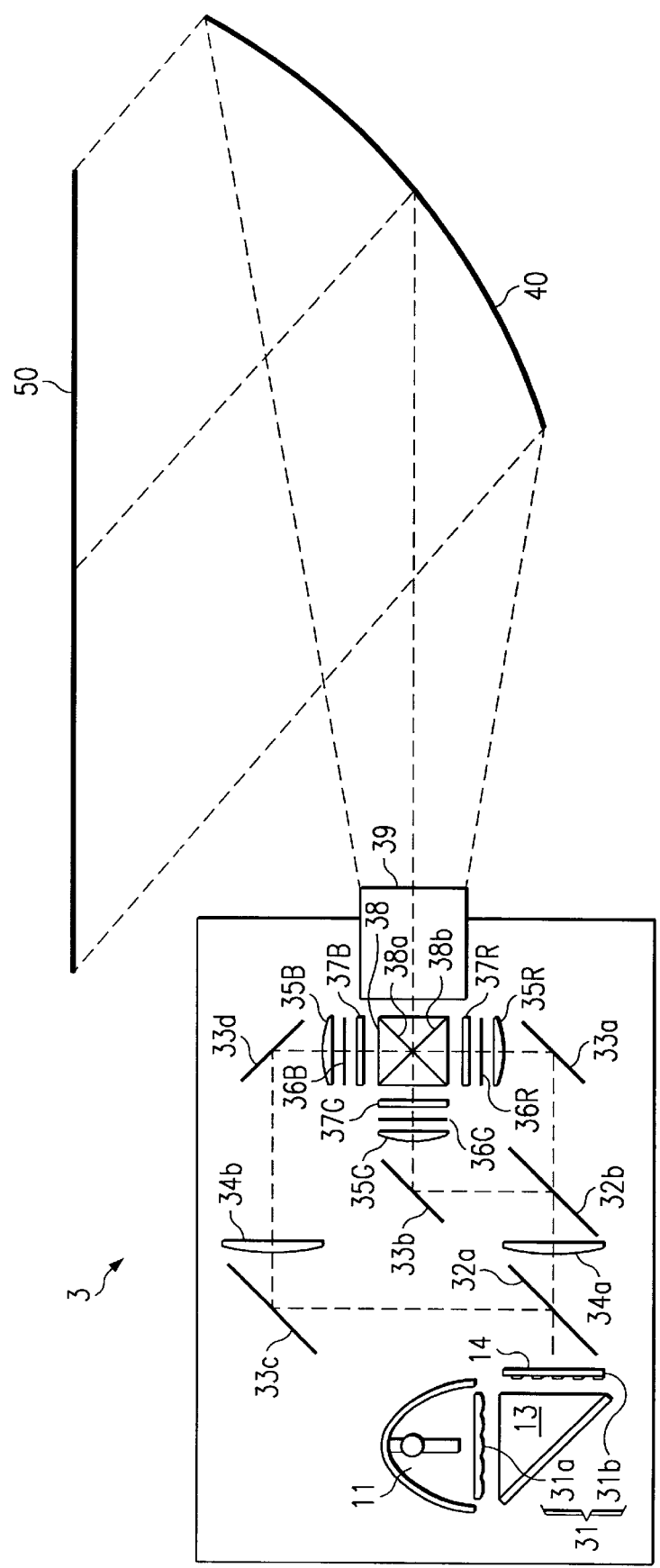
FIG. 8 is a drawing showing the construction of the optical systems of the projecting image display device pertaining to a third embodiment.

FIG. 8 shows the construction of the optical systems of the projecting image display device 3 comprising a third embodiment. This projecting display device 3 comprises a three-panel color image display device and modulates the R, G and B light using separate liquid crystal panels. It also projects the light toward the screen at an angle.

The projecting image display device 3 has, in addition to the light source 11, PBS prism 13 and half-wavelength plates 14, which are the same as in the first embodiment, an integrator 31, two dichroic mirrors 32a and 32b, four total reflection mirrors 33a, 33b, 33c and 33d, two superposing lenses 34a and 34b, three field lenses 35R, 35G and 35B, three micro-lens arrays 36R, 36G and 36B, three transmission-type liquid crystal panel 37R, 37G and 37B, a cross-dichroic prism 38, a projecting optical system 39 and a total reflection concave mirror 40.

The integrator 31 comprises the integrator 12 of the projecting image display device 1 without the superposing lens 12c. Thus, the integrator 31, has only first and second lens arrays 31a and 31b. Superposing lenses 34a and 34b are used outside the integrator 31 in place of a superposing lens such as the superposing lens 12c of the first embodiment. The integrator 31 is set such that the distribution of the light source images it forms matches the distribution of the pixels of the liquid crystal panels 37R, 37G and 37B, and such that the light exiting it becomes parallel light.

The dichroic mirrors 32a and 32b selectively reflect B light and G light but allow light components of other colors to pass through. The white light from the integrator 31 is broken down by the dichroic mirror 32a into light comprising R light and G light that passes through and B light that is reflected. The light comprising R light and G light strikes the dichroic mirror 32b via the superposing lens 34a and is broken down into R light that passes through and G light that is reflected. The R light that passes through the dichroic mirror 32b is reflected by the total reflection mirror 33a and strikes the micro-lens array 36R via the field lens 35R. It then forms images on the pixels of the liquid crystal panel 37R.

The G light reflected by the dichroic mirror 32b is reflected by the total reflection mirror 33b and strikes the micro-lens array 36G via the field lens 35G. It then forms images on the pixels of the liquid crystal panel 37G. The B light reflected by the dichroic mirror 32a is reflected by the total reflection mirror 33c and is again reflected by the total reflection mirror 33d via the superposing lens 34b. This B light strikes the micro-lens array 36B via the field lens 35B and forms images on the pixels of the liquid crystal panel 37B.

The liquid crystal panels 37R, 37G and 37B are not equipped with a color filter, unlike the liquid crystal panel 18 of the projecting image display devices 1 and 2 comprising the first and second embodiments, respectively, and modulate all the light that is supplied to them. In the projecting image display device 3, one pixel unit in the liquid crystal panels 37R, 37G or 37B comprises one pixel. As described below, the pixels of each liquid crystal panel are rectangular, given that they are used for anamorphic projection, and are aligned so that their long sides and short sides are aligned with each other.

The cross-dichroic prism 38 comprises four triangular prisms glued together, the cross-sections of each of which have a right isosceles triangle configuration, and the glued surfaces 38a and 38b comprises dichroic mirror surfaces that selectively reflect R light and B light, respectively, and allow the light of other colors to pass through. The R, G and B light, which are respectively modulated by the liquid crystal panels 37R, 37G and 37B, strike the cross-dichroic prism 38, whereupon the R light is reflected by the dichroic mirror surface 38a, the B light is reflected by the dichroic mirror surface 38b, and the G light passes through the dichroic mirror surfaces 38a and 38b. They then enter the projecting optical system 39 in a synthesized fashion.

The projecting optical system 39 projects the light entering from the cross-dichroic prism 38 toward the concave mirror 40, and causes the reflected light from the concave mirror 40 to strike the screen 50 from an angle. Because the light rays projected by the projecting optical system 40 strike the screen from an angle, they elongate in one direction on the screen 50. In order for the elongated light rays to express images having a natural vertical to horizontal ratio, the projecting optical system 30 performs anamorphic projection. In other words, the magnification of the light rays from the projecting optical system 30 is different for the two directions that are perpendicular to each other.

The curvature of the concave mirror 40 is set based on the angle of the projected light that strikes the screen 50 so that the image on the screen does not become distorted into a trapezoid and such that the projected light forms blur-free images on all points of the screen 50.

The pixels of the liquid crystal panels 37R, 37G and 37B have a flat rectangular configuration which is short in the direction for which the magnification by the projecting optical system 39 is larger and long in the direction for which the magnification by the projecting optical system 39 is smaller. The flatness of the pixels is essentially equal to the ratio of the larger magnification to the smaller magnification of the projecting optical system 39. Therefore, the light passing through each pixel becomes essentially square on the screen 50 and the sharpness of the displayed pixel becomes essentially the same for both the vertical and horizontal directions of the image.

The micro-lens arrays 36R, 36G and 36B each comprise rectangular micro-lens cells which are similar in shape to the pixels of the liquid crystal panels 37R, 37G and 37B, and are aligned in a two-dimensional fashion. The micro-lens cells have an isotropic image-forming capability, and their short sides have about the same length as the long sides of the pixels. The locations of the micro-lens arrays 36R, 36G and 36B relative to the liquid crystal panels 37R, 37G and 37B are the same as explained with reference to FIG. 3 regarding the first embodiment, and can reliably cause the light to form images within the pixels. Therefore, all of the light from the light source 11 is used for modulation and bright images are displayed.

The superposing lenses 34a and 34b have the same capability. The light path lengths from the superposing lens 34a to the liquid crystal panels 37R and 37G, respectively, are set to be the same as the light path length from the superposing lens 34b to the liquid crystal panel 37B. The white light from the integrator 31 is broken down into R and G light and B light when it is parallel light. The R, G and B light components are then led to the liquid crystal panels 37R, 37G and 37B, respectively by means of the superposing lenses 34a and 34b with a uniform distribution. The light path for the B light is longer than the light path for the R light or the light path for the G light, based on the difference in the light path while they are parallel light.

It is also possible to make the amounts of light supplied to the three liquid crystal panels the same by using an integrator that includes a superposing lens as the integrator 12 of the projecting image display device 1 and by locating a relay lens in the longest light path such that the images superposed by means of the lens cells of the first lens array may be relayed. However, using this construction, the superposed image of one color light component that is led via the relay lens becomes reversed relative to the superposed images of the other color light components that are led without passing through the relay lens, whereby slight differences in light intensity easily stand out as chromatic unevenness.

In the projecting image display device 3 in which a dichroic mirror 32a is located in the light path along which parallel light passes such that R and G light is separated from B light, which has a different light path length from the former two light components, and the R and G light and the B light after this chromatic separation are led to the liquid crystal panels 37R, 37G and 37B, respectively by means of superposing lenses 34a or 34b, which are equivalent to each other, the superposed image on each liquid crystal panel does not become reversed. Therefore, even where differences in light intensity exist, the occurrence of chromatic unevenness may be prevented. In addition, where the length of the light path along which parallel light passes changes, the conjugate relationships and magnification relationships between the first lens array 31a and the liquid crystal panels 37R, 37G and 37B change very little, and therefore each light color component may be led to its respective liquid crystal panel with a uniform distribution.

Figure 9:
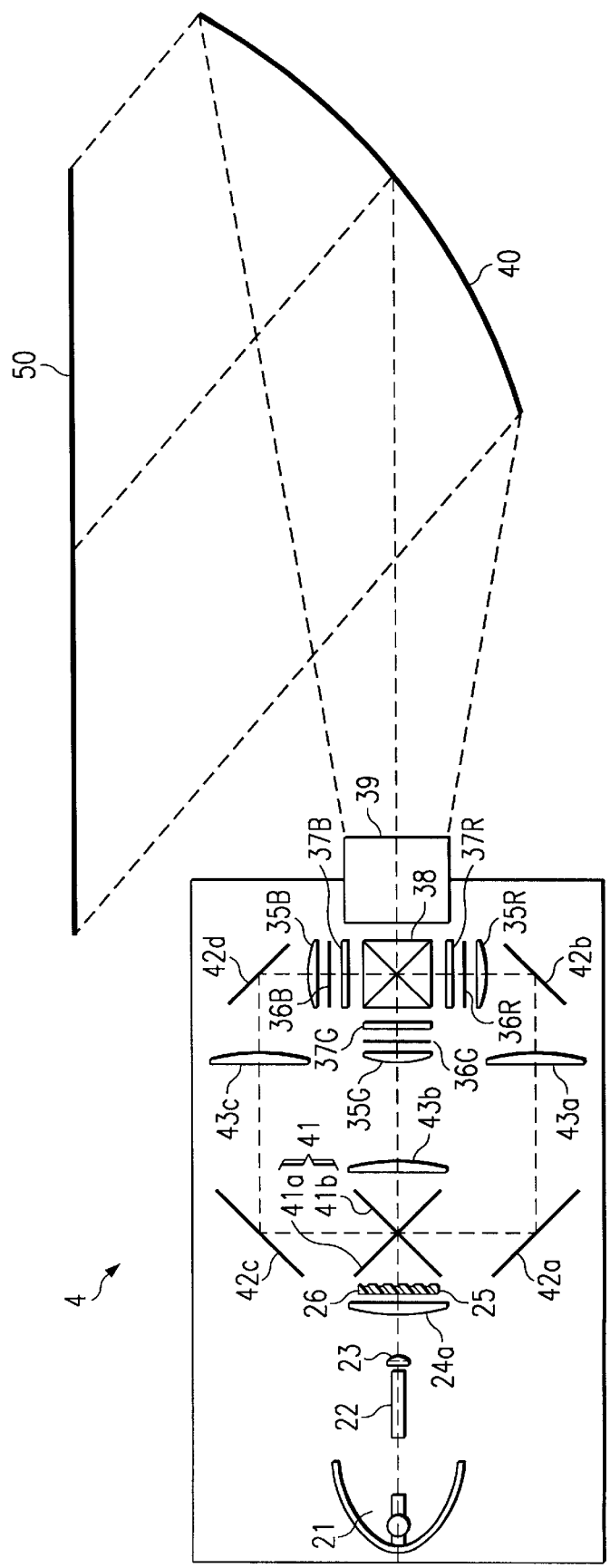
FIG. 9 is a drawing showing the construction of the optical systems of the projecting image display device pertaining to a fourth embodiment.

FIG. 9 shows the construction of the optical systems of the projecting image display device 4 comprising a fourth embodiment. In the projecting image display device 4, the optical system that leads the light to the liquid crystal panels in the projecting image display device 3 is replaced with another optical system, but the same field lenses 35R, 35G and 35B, micro-lens arrays 36R, 36G and 36B, liquid crystal panels 37R, 37G and 37B, cross-dichroic prism 38, projecting optical system 39, and total reflection concave mirror 40 are used.

The projecting image display device 4 has the light source 21, kaleidoscope 22, condenser lens 23, relay lens 24a, PBS prism array 25 and half-wavelength plates 26 of the projecting image display device 2 comprising the second embodiment, as well as a cross-dichroic mirror 41, four total reflection mirrors 42a, 42b, 42c and 42d, and three relay lenses 43a, 43b and 43c. Three relay optical systems that are equivalent to the relay optical system 24 of the projecting image display device 2 are formed by the relay lens 24a and the relay lenses 43a, 43b and 43c, respectively.

The cross-dichroic mirror 41 comprises dichroic mirrors 41a and 41b that selectively reflect R light and B light, respectively, and allow light components of other colors to pass through. The light from the light source images formed on the PBS prism array 25 travels in a parallel fashion and strikes the cross-dichroic mirror 41 and is broken down into R light that is reflected by the dichroic mirror 41a, B light that is reflected by the dichroic mirror 41b and G light that passes through both mirrors.

The R light strikes the micro-lens array 36R via the total reflection mirror 42a, the relay lens 43a, the total reflection mirror 42b and the field lens 35R, and forms images on the pixels of the liquid crystal panel 37R. The G light strikes the micro-lens array 36G via the relay lens 43b and the field lens 35G, and forms images on the pixels of the liquid crystal panel 37G. The B light strikes the micro-lens array 36B via the total reflection mirror 42c, the relay lens 43c, the total reflection mirror 42d and the field lens 35B, and forms images on the pixels of the liquid crystal panel 37B.

The R, G and B light modulated by means of the liquid crystal panels 37R, 37G and 37B, respectively, are synthesized by the cross-dichroic prism 38, projected anamorphically by means of the projecting optical system 39, and are reflected by the concave mirror 40, striking the screen 50 at an angle and forming an image having a natural vertical to horizontal ratio. Due to the relationship between the micro-lens arrays 36R, 36G and 36B and the liquid crystal panels 37R, 37G and 37B as described above, all of the light from the light source 21 is used for the modulation and bright images are obtained.

In the projecting image display device 4, the light paths for the R light and B light are longer than that for the G light. The relay lenses 43a, 43b and 43c have the same capability and the light path lengths from the relay lenses 43a, 43b and 43c to the liquid crystal panels 37R, 37G and 37B, respectively, are set to be identical. In this device as well, the light undergoes chromatic breakdown while it is traveling in the light path where all the light components are parallel and images without chromatic unevenness may be displayed.

In the embodiments described above, the light source images that comprise the secondary light source are individually led to the pixel units of the liquid crystal panels. If the multiple light source images that comprise the secondary light source are divided into groups and the light source images in one group are led to the pixel units of the liquid crystal panel together, the micro-lens F numbers may be further reduced. The fifth and sixth embodiments in which this is attained are explained below.

Figure 10:
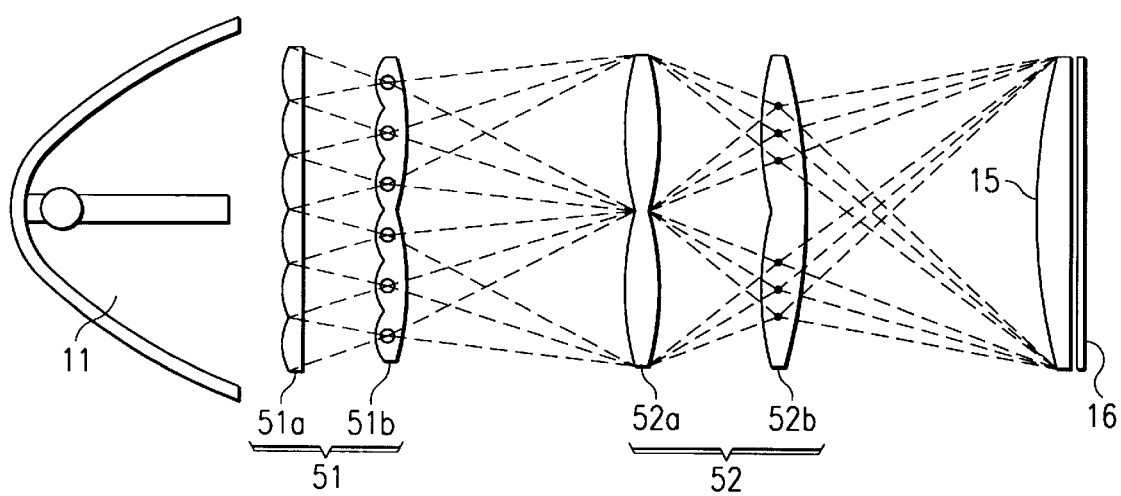
FIG. 10 is a drawing showing a part of the optical systems of the projecting image display device pertaining to a fifth embodiment.

FIG. 10 shows a part of the optical systems of the projecting image display device comprising the fifth embodiment. The projecting image display device of this embodiment comprises the projecting image display devices 1 or 3 in which the integrators 12 or 31 are replaced with two-tier integrators 51 and 52. The first integrator 51 comprises a first lens array 51a and a second lens array 51b, and causes the light from the light source 11 to form images by means of each lens cell of the first lens cell array 51a onto the corresponding lens cell of the second lens array 51b.

The second integrator 52 comprises a first lens array 52a and a second lens array 52b that are three times as large as the lens array 51b, and causes 3×3 light source images on the lens array 51b to form images again by means of each lens cell of the first lens array 52a on the corresponding lens cell of the second lens array 52b. The distances between the light source images on one lens cell of the lens array 52b are smaller than the distances between the light source images on the lens array 51b such that the light source images are divided into groups on the lens array 52b. The distances between groups become larger than the distances between the light source images on the lens array 51b.

The micro-lens array that is supplied light from the lens array 52b via the field lens 15 and the diffraction grating 16 causes the light from the light sources of each group on the lens array 52b to form images on all pixels of the liquid crystal panel. When this happens, because the distances between the groups are larger, the focal length of the micro-lens array becomes shorter than when the light from the light source images on the lens array 51b is caused to form images directly on the liquid crystal panel. Because the focal length becomes shorter, the F numbers for the micro-lens array become smaller, and consequently image blur is reduced. In this example, the focal length is reduced to one-third of its previous value and the F numbers and the image blur are also reduced by the same percentage.

In this embodiment, an example was used in which nine light source images are deemed one group, but the number of light source images to be included in one group may be freely chosen. In addition, the number of integrators is not limited to two. It is possible to use three or more integrators. Decisions regarding these issues should be made in consideration of the size of the pixels of the liquid crystal panels and the space needed to house the optical systems.

Figure 11:
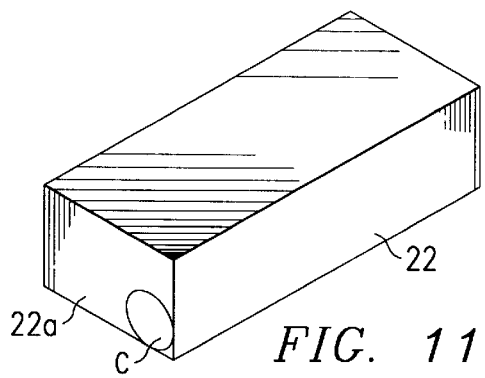
FIG. 11 is a drawing showing the kaleidoscope, a part of the optical systems of the projecting image display device pertaining to a sixth embodiment, and the position at which the light strikes the kaleidoscope.
Figure 12:
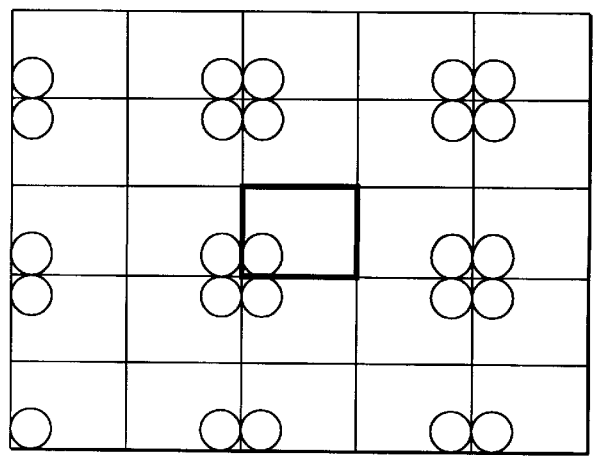
FIG. 12 is a drawing showing the distribution of the light source images formed by the kaleidoscope and the condenser lens comprising a part of the projecting image display device pertaining to the sixth embodiment.

The projecting image display device comprising the sixth embodiment has a construction similar to that of the projecting image display device equipped with a kaleidoscope 22, i.e., the projecting image display devices 2 and 4, but the position on the kaleidoscope 22 at which the light strikes is different. FIG. 11 shows the kaleidoscope 22 and the position at which the light from the light source strikes it, and FIG. 12 shows the distribution of the light source images thus formed. In the projecting image display device of this embodiment, the light from the light source is caused to form an image not in the center of the light entry plane 22a of the kaleidoscope 22 but at a corner C of the light entry plane 22a. Because the distance from the light entry position to the reflective surfaces of the kaleidoscope 22 varies vertically and horizontally, the distribution of the light source images formed becomes as shown in FIG. 12, in which four light source images comprise one group.

The focal length and the F numbers of the micro-lens array needed to cause the light from the light source images of each group to strike all the pixels of the liquid crystal panel are half of those required when the light from ungrouped light source images is caused to strike all the pixels. It is also possible to cause the light from the light source to form an image near the center of one side of the light entry plane 22a such that two light source images comprise one group.

As mentioned at the end of the explanation of the first embodiment, it is possible to use a construction in which two pixel units of the liquid crystal panel are covered by the long side or the short side of one micro-lens cell. In that case, if the direction of the separation of the differently polarized light components is made to match the direction in which the side that covers two pixel units travels, unless the separation of differently polarized light components and the conversion of polarization are performed perfectly, some pixel units may come to receive only light that has always been S-polarized light, while other pixel units may come to receive only light that was converted into S-polarized light from P-polarized light, resulting in variations among the pixel units in their amounts of received light.

In the projecting image display devices 1 through 4 of the first through fourth embodiments, because an odd number of pixel units are covered by the long side and the short side of each micro-lens cell, respectively, this problem does not occur. The seventh through ninth embodiments, in which the variations in the amounts of received light among the pixel units are reduced regardless of the number of pixel units covered by the micro-lens cell and the direction of the separation of the differently polarized light components, are explained below.

Figure 13:
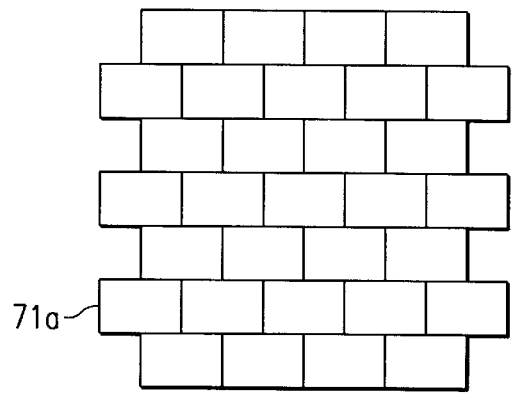
FIG. 13 is a drawing showing the first lens array of the integrator comprising a part of the optical systems of the projecting image display device pertaining to a seventh embodiment.

The projecting image display device comprising the seventh embodiment is the same as the projecting image display devices 1 or 3, in which the first lens arrays 12a or 31a of the integrators 12 or 31 are replaced with another lens array. FIG. 13 shows the lens array 71a of this projecting image display device. In the lens arrays 12a and 31a, the long sides and the short sides of the lens cells were aligned with each other, but in the lens array 71a, only the long sides of the lens cells are aligned with each other, and the short sides are pushed over half the length of the long side of each lens cell such that the lens cells are aligned in a zigzag fashion. The separation of the differently polarized light components is performed along the long sides of the lens cells.

Figure 14:
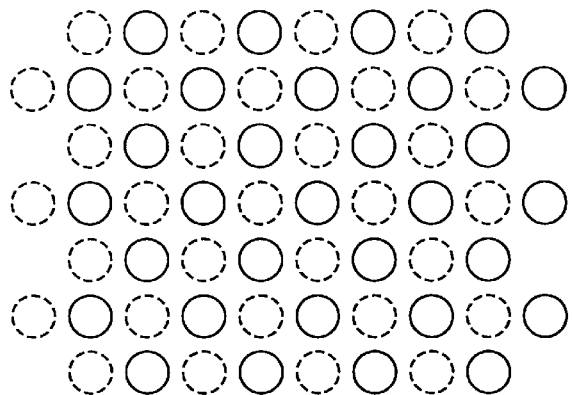
FIG. 14 is a drawing showing the distribution of the light source images formed by the first lens array of the projecting image display device pertaining to the seventh embodiment.

FIG. 14 shows the distribution of the light source images formed on the second lens array by means of the lens array 71a. In FIG. 14, the light source images indicated using solid lines are those formed by S-polarized light and those indicated using dotted lines are those formed by P-polarized light. The light source images are distributed in a linear fashion along the two perpendicular directions that correspond to the long sides and short sides of the lens cells, respectively, and the light source images formed from P-polarized light and those formed from S-polarized light appear alternately in both directions. By converting the polarization by placing half-wavelength plates in the light path along which the P-polarized light travels, all light may be supplied to the liquid crystal panel as S-polarized light.

Both the light that has been S-polarized light to begin with and the light that has been converted from P-polarized light into S-polarized light are supplied to all pixel units, and therefore, even if the separation of the differently polarized light components and the conversion of polarization are imperfect, no differences occur among the pixel units in the amounts of received light. Therefore, regardless of the number of pixel units that are covered by one micro-lens cell, and regardless of the direction of the separation of the differently polarized light components, the same amount of light may be supplied to the pixel units at all times, which increases the amount of freedom with which the micro-lens array and the liquid crystal panel may be designed.

Figure 15:
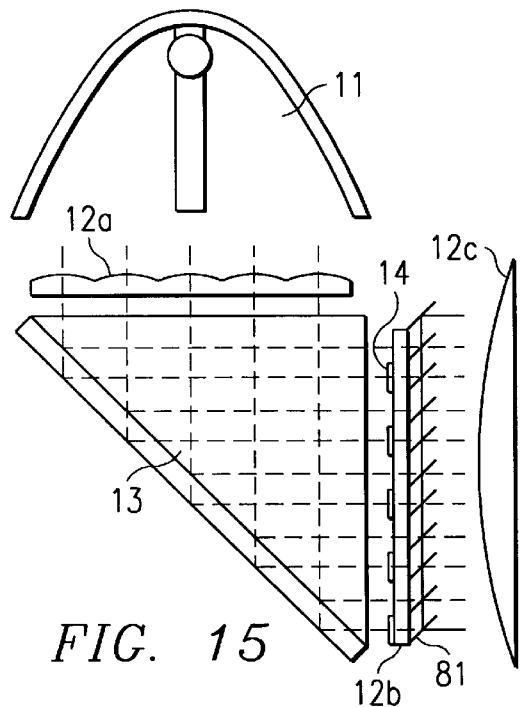
FIG. 15 is a drawing showing the construction of a part of the optical systems of the projecting image display device pertaining to an eighth embodiment.

FIG. 15 shows a part of the optical systems of the projecting image display device comprising the eighth embodiment. This projecting image display device comprises the projecting image display device 1 or 3, with half mirrors 81 added to the exit plane of the second lens array 12b of the integrator 12. The half mirrors 81 have a belt configuration, and one half-mirror 81 is located for each line of lens cells aligned in the direction perpendicular to the direction of the separation of the differently polarized light components by means of the PBS prism 13. Because each half mirror 81 allows a part of the light to pass through and reflects the rest of the light, the light that has been S-polarized light to begin with and the light that was converted from P-polarized light into S-polarized light become mixed together and the same amount of light is supplied to all pixel units of the liquid crystal panel.

Figure 16:
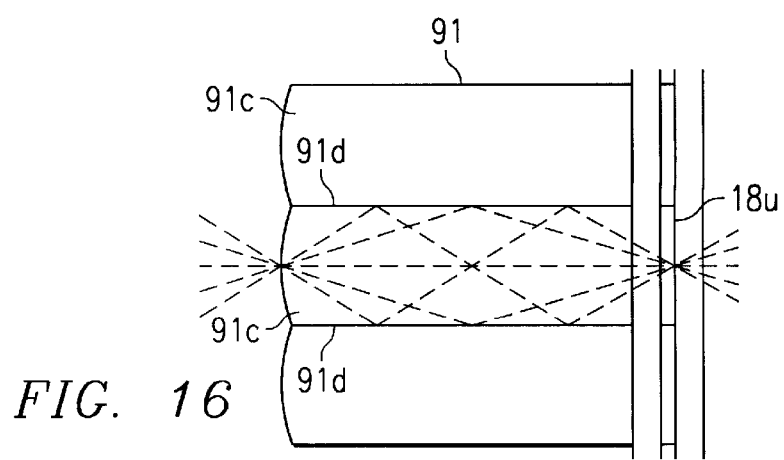
FIG. 16 is a drawing showing the micro-lens array comprising a part of the optical systems of the projecting image display device pertaining to a ninth embodiment.

The projecting image display device of the ninth embodiment comprises the projecting image display devices 1 or 3, in which a micro-lens array in which the borders between the micro-lens cells comprise half-mirrors is used in place of the micro-lens array of the projecting image display devices 1 or 3. FIG. 16 shows the cross- section of the micro-lens array 91 of this projecting image display device. A half-mirror 91d is placed between two adjacent micro-lens cells 91c, and the light rays that strike a micro-lens cell 91c from different lens cells of the second lens array of the integrator are partially reflected by the half-mirrors 91d and strike the same pixel unit 18u.

The light from adjacent lens cells of the second lens array comprise light that has always been S-polarized light and light that was converted into S-polarized light from P-polarized light, and the light that strikes the pixel units 18u comprises both types of light. Therefore, even if the separation of the differently polarized light components and the conversion of polarization were imperfect, no differences occur among the pixel units 18u in the amounts of received light. It is also acceptable if empty spaces are formed between the micro-lens cells 91c in place of the half-mirrors 91d.

When the projecting image display device of this embodiment is used, light having uniform intensity may be led to the liquid crystal panel by means of the light source image forming optical system, and moreover, in spite of the fact that the pixels of the liquid crystal panel have a flat configuration, the light may be contained in each pixel by means of the lens array comprising lens cells that are flat in the directions perpendicular to the pixels. Consequently, bright images that have even brightness and that effectively use the light from the light source may be displayed.

In the construction in which the ratio of the long side length to the short side length of each pixel of the liquid crystal panel and the ratio of the long side length to the short side length of each lens cell are essentially equal, the light may be caused to form images of an appropriate size in both directions. Therefore, it is possible to cause the light to enter many pixels by means of one lens cell without the shape of the lens cells becoming excessively flat, such that the uniformity of the intensity of the light led to the liquid crystal panel is not easily lost.

In the construction in which the magnification of the light rays from the projecting optical system is smaller for the horizontal direction (in which the long sides of the pixels of the liquid crystal panel are aligned) is longer than the magnification for the vertical direction (in which the short sides of the pixels are aligned), it is not necessary for the projecting image display device to face the screen at a right angle, and the entire construction, including the screen, may become compact. Moreover, the sharpness of the images displayed is not so different from one direction to the other, making it possible to display high quality images.

Embodiments in which light source image distribution is corrected

Figure 17:
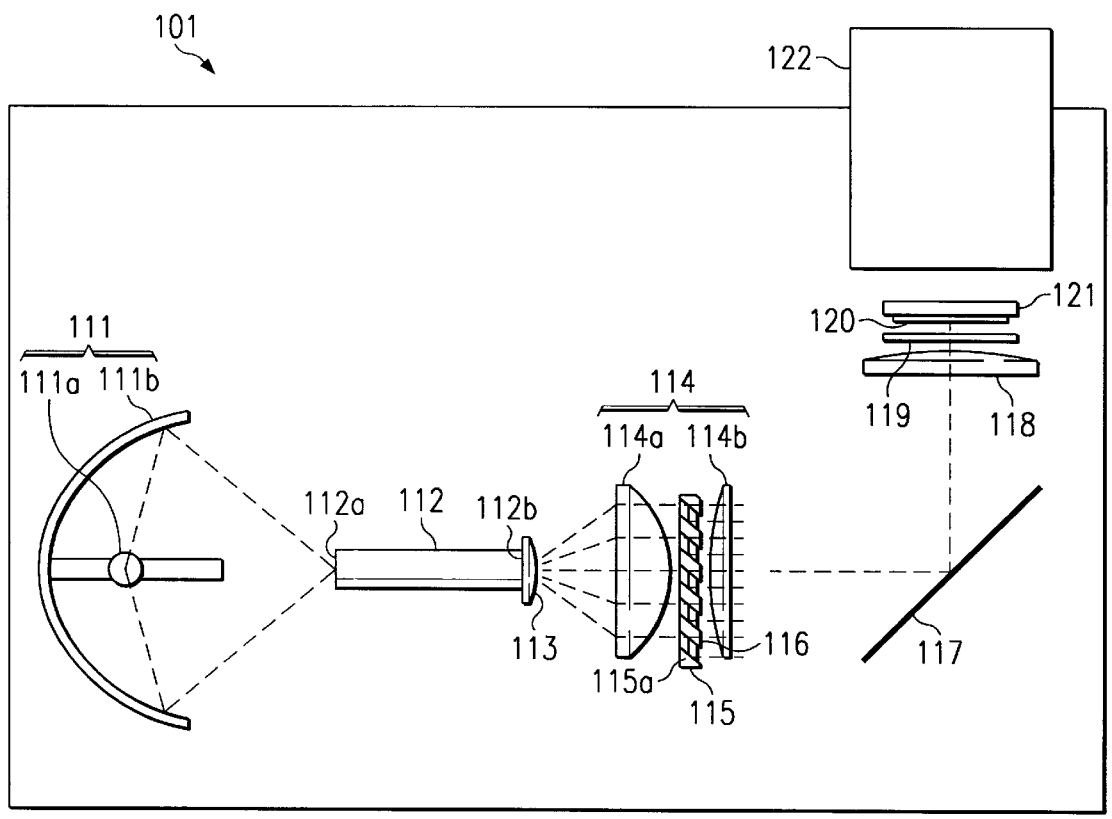
FIG. 17 is a drawing showing the construction of the optical systems of the projecting image display device pertaining to a tenth embodiment.

FIG. 17 shows the construction of the optical systems of the projecting image display devices 101 comprising a tenth embodiment. The projecting image display device 101 is a single-panel color image display device that modulates the R, G and B light by means of a single liquid crystal panel.

The projecting image display device 101 comprises a light source 111, a kaleidoscope 112, a condenser lens 113, a relay optical system 114, a PBS prism array 115, half-wavelength plates 116, a total reflection mirror 117, a field lens 118, a diffraction grating 119, a micro-lens array 120, a transmission-type liquid crystal panel 121, and a projecting optical system 122. The liquid crystal panel 121 has a rectangular configuration with a 4:3 ratio between the long side length and the short side length.

The light source 111 comprises a metal halide lamp 111a and an ellipsoidal reflector 111b. The lamp 111a emits white light that has random planes of polarization and includes all wavelengths in the visible range. The lamp 111a is located on the first focal point of the reflector 111b, which reflects the light emitted by the lamp 111a and causes it to converge onto the second focal point.

The kaleidoscope 112 has a rectangular cross-section with a 4:3 ratio between the side corresponding to the long side of the liquid crystal panel 121 and the side corresponding to the short side of the liquid crystal panel 121. The light entry plane 112a of the kaleidoscope 112 is located on the second focal point of the reflector 111b and is essentially conjugate with the lamp 111a. The light from the lamp 111a forms an image in the center of the light entry plane 112a and enters the kaleidoscope efficiently. The light that enters the kaleidoscope repeats total reflection inside the kaleidoscope 112 and exits from the light exit plane 112b with an even light distribution.

The condenser lens 113 is located close to the light exit plane 112b of the kaleidoscope 112, and causes the light exiting the kaleidoscope 112 to form images on the pupil plane of the relay optical system 114. The light entry plane 112a of the kaleidoscope 112 is essentially conjugate with the pupil plane of the relay optical system 114. Multiple light source images are formed at positions on the pupil plane of the relay optical system 114 that correspond to the number of reflections inside the kaleidoscope 112. Again, how do positions correspond to the number of reflections?

The relay optical system 114 comprises two convex lenses 114a and 114b, and the lens 114a, which is located on the light entry side, makes the light rays from the kaleidoscope 112 parallel when they travel from the lens 114a to the lens 114b. An aspherical lens is used for the lens 114a in order to increase the degree of parallelism of the light. The light exit plane 112b of the kaleidoscope 112 is essentially conjugate with the liquid crystal panel 121 relative to the relay optical system 114, and because the cross-section of the kaleidoscope 112 is similar in shape to the liquid crystal panel 121, the light is efficiently led to the liquid crystal panel 121.

The pupil of the relay optical system 114 is located between the lens 114a and the lens 114b, and the secondary light source images formed by means of the condenser lens 113 are formed on the pupil plane between the lenses 114a and 114b. The PBS prism array 115 is located on the pupil plane of the relay optical system 114. Belt-like PBS films 115a that allow the P-polarized light to pass through and reflect the S-polarized light are located on the PBS prism array 115. The PBS films 115a are located such that they are angled by 45 degrees relative to the optical axis of the relay optical system 114 and are parallel to and equidistant from one another. The half-wavelength plates 116 are located on the lens 114b side of the PBS prism array 115 such that they face every other PBS film 115a.

The light that passes through the entry side lens 114a of the relay optical system 114 forms images on the PBS prism array 115 and is also separated into P-polarized light that passes through the PBS films 115a and S-polarized light that is reflected by them. The P-polarized light that passes through the PBS films 115a strikes the half-wavelength plates 116. While passing through the half-wavelength plates 116, the P-polarized light is converted into S-polarized light and strikes the lens 114b. On the other hand, the S-polarized light reflected by the PBS films 115a is reflected by the adjacent PBS films 115a again and strikes the lens 114b after passing between the half-wavelength plates 116. Therefore, the light that strikes the lens 114b, i.e., all of the light that exits the relay optical system 114 becomes S-polarized light.

In this embodiment as well, in which multiple light source images are formed by means of a kaleidoscope 112, the need for a large prism is eliminated and the device may be made small and lightweight by combining a relay optical system 114 and a PBS prism array 115 in this manner.

Figure 18:
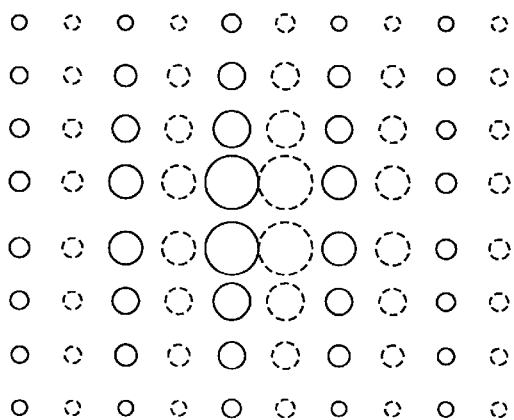
FIG. 18 is a drawing showing the distribution of the light source images formed by the kaleidoscope and the condenser lens of the projecting image display device pertaining to the tenth embodiment.

FIG. 18 shows the distribution of the light source images formed from the light from the light source 111 on the PBS prism array 115. In FIG. 18, the light source images indicated using solid lines are those formed by S-polarized light and the light source images indicated using dotted lines are those formed by P-polarized light. The light from the latter light source images is later converted into S-polarized light. Because the cross-section of the kaleidoscope 112 has a rectangular configuration with a 4:3 ratio between the long side length and the short side length, similar to the liquid crystal panel 121, and the separation of the differently polarized light components occurs along the long side of the cross-section of the kaleidoscope 112 by means of the PBS prism array 115, the ratio between the light source image alignment pitch in the direction corresponding to the long side of the liquid crystal panel 121 and the alignment pitch in the direction corresponding to the short side of the liquid crystal panel 121 is 2:3.

The total reflection mirror 117 reflects the light from the relay optical system 114 and leads it to the field lens 118. The total reflection mirror 117 is used in order to reduce the size of the entire projecting image display device 101, and may be eliminated if the field lens 118, the liquid crystal panel 121, the projecting optical system 122, etc., are located on the optical axis of the relay optical system 114.

The field lens 118 causes the light from the relay optical system 114 to travel in a direction essentially perpendicular to the liquid crystal panel 121 so that all the light passing through the liquid crystal panel 121 will enter the projecting optical system 122. The diffraction grating 119 diffracts the white light from the relay optical system 114 that passes through the field lens 118 and breaks it down into three color light components, i.e., R, G and B.

The micro-lens array 120 causes the incident light to form images on the liquid crystal panel 121. In other words, the pupil plane of the relay optical system 114 and the liquid crystal panel 121 are essentially conjugate with each other. The three color light components, i.e., R, G and B, obtained after the separation performed by the diffraction grating 119, travel in directions slightly different from one another because of the differences in their diffraction angles, and are caused to form images on different pixels on the liquid crystal panel 121 by means of the micro-lens array 120.

The projecting optical system 122 projects the light passing through and modulated by the pixels of the liquid crystal panel 121 onto the screen not shown in the drawing. The light thus projected forms images on the screen, displaying a color image.

The liquid crystal panel 121 comprises multiple pixels aligned in a two-dimensional fashion, wherein there are three different types of pixels to modulate the R, G and B light, respectively. The pixels each have a rectangular configuration in which the short side length is one third of the long side length, and are located so that the long sides and the short sides of the multiple pixels are aligned with each other. The three types of pixels are arranged in an alternating fashion such that they are stacked on top of one other along their short sides. Three pixels that are stacked on top of one other along their short sides modulate the light that expresses one point of an image. The group of three adjacent pixels stacked along their short sides will hereinafter be called a pixel unit.

The pixel units are essentially square in shape and are aligned at the same pitch horizontally (along the long side of the liquid crystal panel 121) and vertically (along the short side of the liquid crystal panel 121). Therefore, the distribution of the light source images formed on the pupil plane of the relay optical system 114 by means of the kaleidoscope 112 and the condenser lens 113 does not match the distribution of the pixel units of the liquid crystal panel 121. The distribution of the light source images formed on the pupil plane of the relay optical system 114 is the distribution of the pixel units multiplied using different magnifications for the horizontal direction (along the long side of the liquid crystal panel 121) and the vertical direction (along the short side of the liquid crystal panel 121). In order to correct this difference in distributions and efficiently lead the light of the light source images to the pixel units, the image forming capability of the micro-lens array 120 is different for the horizontal direction (along the long side of the liquid crystal panel 121) and the vertical direction (along the short side of the liquid crystal panel 121).

Figure 19:
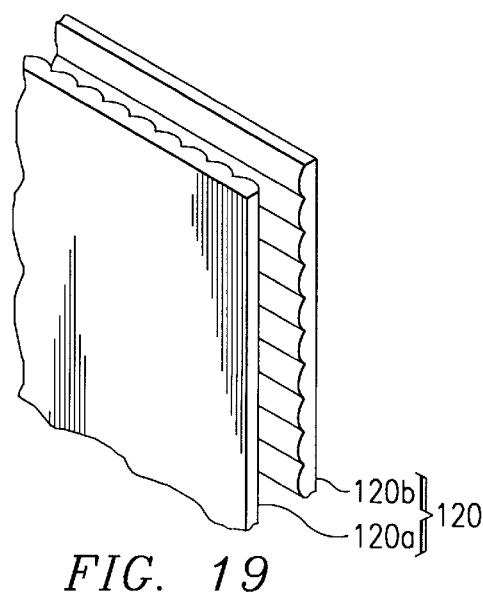
FIG. 19 is a perspective view showing the micro-lens array of the projecting image display device pertaining to the tenth embodiment.

FIG. 19 shows the micro-lens array 120. The micro-lens array 120 comprises two cylindrical lens arrays 120a and 120b, each separately formed with a plate-like configuration. The lens arrays 120a and 120b are located such that the cylindrical lenses of one lens array are aligned perpendicular to the cylindrical lenses of the other. The micro-lens array 120 is located such that the cylindrical lenses of the lens array 120a are aligned horizontally (the same direction in which the long side of the liquid crystal panel 121 extends) and the cylindrical lenses of the lens array 120b are aligned vertically (the same direction in which the short side of the liquid crystal panel 121 extends), and such that the lens array 120b is on the side of the liquid crystal panel 121. The width of each cylindrical lens of the lens arrays 120a or 120b is an exact multiple of the length of one side of the pixel unit.

The focal length of the cylindrical lenses of the lens array 120b is set to be shorter than the focal length of the cylindrical lenses of the lens array 120a, so that the alignment pitch of the light source images on the pupil plane of the relay optical system 114 the ratio of the horizontal alignment pitch (which corresponds to the long side of the liquid crystal panel 121) to the vertical alignment pitch (which corresponds to the short side of the liquid crystal panel 121) being 2:3 may become 1:1 on the liquid crystal panel 121, i.e., equal to the alignment pitch for the pixel units both horizontally and vertically. Due to this difference in focal lengths, the distribution of the light source images is corrected, whereby the distribution of the light source images on the liquid crystal panel 121 matches the distribution of the pixel units and the light may be efficiently led to the pixels.

In a cylindrical lens that is formed to correspond to the size of the pixel unit of the liquid crystal panel, the F numbers cannot help but become large and the light source images formed on the pixels become blurry due to the effect of diffraction. However, in the projecting image display device 101, the F number of the micro-lens array 120 is made small for the direction in which the short sides of the pixels extend by having the direction of chromatic separation by means of the diffraction grating 119 be the direction in which the short sides of the pixels of the liquid crystal panel 121 extend, as well as by locating the lens array 120b that forms images along the short sides of the pixels be closer to the liquid crystal panel 121 and by setting its focal length to be short. Consequently, the vertical blur of the light source images (along the short sides of the pixels) is reduced and the light may be reliably contained within the pixels.

As described above, in a single-panel color image display device, the direction of chromatic separation should match the direction of image formation by the cylindrical lens array that is closer to the liquid crystal panel. It is also possible to reduce the image blur by increasing the widths of the cylindrical lenses of the lens arrays 120a and 120b, thereby reducing the F numbers of the micro-lens array 120.

Figure 20:
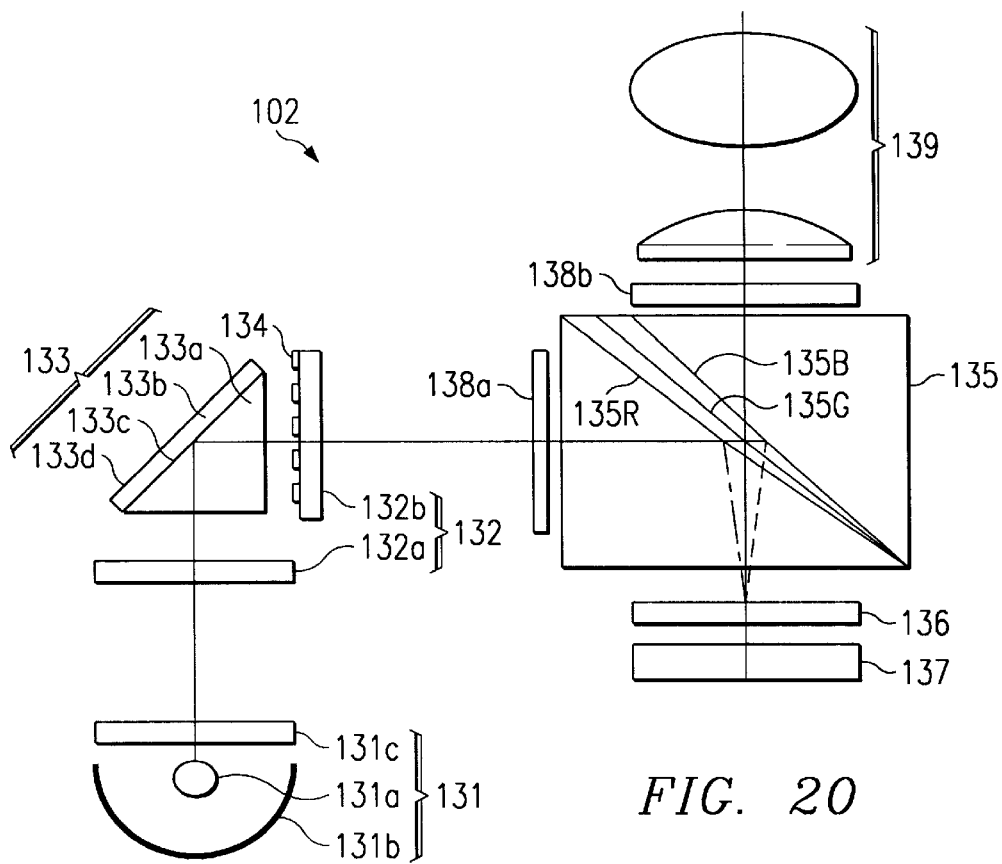
FIG. 20 is a drawing showing the construction of the optical systems of the projecting image display device pertaining to an eleventh embodiment.

FIG. 20 shows the construction of the optical systems of the projecting image display device 102 comprising an eleventh embodiment. This projecting image display device 102 is also a single-panel color image display device that modulates the R, G and B light by means of a single liquid crystal panel. However, in the projecting image display device 102, light modulation is performed by means of a reflective liquid crystal panel instead of a transmission-type liquid crystal panel. The projecting image display device 102 has a light source 131, an integrator 132, a PBS prism 133, half-wavelength plates 134, a dichroic PBS prism 135, a micro-lens array 136, a reflective liquid crystal panel 137, polarizing plates 138a and 138b and a projecting optical system 139. The liquid crystal panel 137 has a rectangular configuration with a 4:3 ratio between the long side length and the short side length.

The light source 131 comprises a metal halide lamp 131a, a parabolic reflector 131b and an UV cut filter 131c. The lamp 131a emits white light that has random planes of polarization and includes all wavelengths in the visible range. The lamp 131a is located on the focal point of the reflector 131b, which reflects the light emitted by the lamp 131a such that the light is converted into parallel light rays. The UV cut filter 131c eliminates UV-range wavelengths from the light that strikes it from the reflector 131b and allows only visible range wavelengths to pass through.

The integrator 132 comprises first and second lens arrays 132a and 132b, each comprising multiple lens cells aligned in a two-dimensional fashion. Each lens cell of the first lens array 132a has a rectangular configuration similar to that of the liquid crystal panel 137, and the optical axis of each lens cell is perpendicular to the panel surface. The lens array 132b of the second lens array 132b has twice as many lens cells as the first lens array 132a, and a pair of adjacent lens cells of the lens array 132b correspond to one lens cell of the lens array 131a.

Each lens cell of the first lens array 132a causes the light from the light source 131 to form an image on the corresponding lens cells of the second lens array 132b. A light source image is formed on each lens cell of the second lens array 132b, such that the lens array 132b becomes a planar secondary light source in which multiple light source images are aligned in a two-dimensional fashion. The lens cells of the lens array 132b are set such that it leads the light that passes through it to the entire surface of the liquid crystal panel 137.

In other words, the first lens array 132a and the liquid crystal panel 137 are essentially conjugate to each other and the second lens array 132b and the light source 131 are essentially conjugate to each other. The light from the light source 131 that strikes each lens cell of the first lens array 132a is first made to form individual light source images and is then superposed on the liquid crystal panel 137.

The PBS prism 133 comprises a triangular prism 133a, the cross-section of which has a right isosceles triangle configuration, and a parallel flat panel 133b that adheres to the slanted surface of the prism. A PBS film 133c that allows the P-polarized light to pass through and reflects the S-polarized light is formed on the surface of the flat panel 133b that is in contact with the prism 133a, and the other surface of the flat panel 133b comprises a total reflection surface 133d. The lens arrays 132a and 132b of the integrator 132 are located such that they each face one of the two surfaces of the prism 133a that are perpendicular to each other.

The light from the light source 131 that passes through the lens cells of the first lens array 132a strikes the PBS film 133c and separates into differently polarized light components, as the S-polarized light included in said light is reflected by the PBS film 133c while the P-polarized light passes through the PBS film 133c. The S-polarized light reflected by the PBS film 133c strikes one of the two lens cells of each pair in the second lens array 132b and forms images. The P-polarized light that passes through the PBS film 133c is reflected by the total reflection surface 133d strikes the other lens cell of each pair in the second lens array 132b and forms images.

The half-wavelength plates 134 are located on the PBS prism 133 side of the lens array 132b such that they correspond to the lens cells which the P-polarized light strikes. The half-wavelength plates 134 convert the P-polarized light passing through them into S-polarized light, and therefore, all of the light that strikes the lens array 132b, i.e., the light that exits the integrator 132, becomes S-polarized light. The projecting image display device is also equipped with a polarizing plate 138a that cuts off P-polarized light if the separation of the differently polarized light components or the conversion of polarization was imperfect and P-polarized light became mixed in with the light exiting the integrator 132.

The separation of the differently polarized light components by means of the PBS prism 133 takes place along the long sides of the lens cells of the first lens array 132a. Therefore, the light source images on the second lens array 132b have the same alignment pitches as the light source images in the projecting image display device 1, i.e., the ratio between the alignment pitch in the direction corresponding to the long side of the liquid crystal panel 137 and the alignment pitch in the direction corresponding to the short side of the liquid crystal panel 137 is 2:3.

The dichroic PBS prism 135 has three dichroic PBS films 135R, 135G and 135B, which are positioned at slightly different angles. The dichroic PBS film 135R selectively reflects the S-polarized R light and allows S-polarized light of other colors and P-polarized light of any color to pass through. The dichroic PBS film 135G reflects S-polarized G light and allows S-polarized B light and P-polarized light of any color to pass through. The dichroic PBS film 135B reflects S-polarized B light and allows P-polarized light of any color to pass through. The S-polarized white light that strikes the prism 135 from the integrator 132 via the polarizing plate 138a is separated into R, G and B light components by means of the dichroic PBS films 135R, 135G and 135B, respectively, and due to the differences in the angles of the PBS films, the R, G and B light components obtained after this chromatic separation are reflected in directions slightly different from one another.

Three dichroic mirrors and one PBS prism may be used in place of the dichroic PBS prism 135. In that case, the PBS prism should be located at the location of the prism 135 and the three dichroic mirrors should be located between the PBS prism and the integrator 132 such that they are positioned at slightly different angles from one another.

The micro-lens array 136 causes the incident light to form images on the liquid crystal panel 137. In other words, the second lens array 132b of the integrator 132 and the liquid crystal panel 137 are essentially conjugate with each other. The three color light components, R, G and B, obtained through the separation of the light components performed by the dichroic PBS prism 135, travel in directions slightly different from one another due to the differences in their angles of reflection, and are caused to form images on different pixels of the liquid crystal panel 137 by means of the micro-lens array 136.

The pixels of the liquid crystal panel 137 are set to be identical to those in the liquid crystal panel 121 of the projecting image display device 101. In other words, three pixels having an approximately 3:1 ratio between the long side length and the short side length comprises one pixel unit, and the pixel units are essentially square and are aligned using the same pitch both horizontally (along the long side of the liquid crystal panel 137) and vertically (along the short side of the liquid crystal panel 137).

The R, G and B light components change from S-polarized light into P-polarized light when modulated by the liquid crystal panel 137. Each light component reflected by the liquid crystal panel 137 passes through the micro-lens array 136 and the dichroic PBS prism 135 that freely allows P-polarized light to pass through, and enters the polarizing plate 138b. The polarizing plate 138b cuts out S-polarized light, such that it prevents S-polarized light, such as stray light, from striking the projecting optical system 139. The projecting optical system 139 projects the light entering it from the polarizing plate 138b onto the screen not shown in the drawing, whereupon the projected light forms images on the screen, displaying a color image.

The micro-lens array 136 comprises two cylindrical lens arrays that form images in directions perpendicular to each other and have different focal lengths. The focal lengths and positional relationships of the two cylindrical lens arrays relative to the liquid crystal display panel 137 are identical to those explained with reference to the tenth embodiment. The light from the light source images is caused to form images on the liquid crystal panel 137 while causing the light source images formed by means of the integrator 132 and having a distribution different from the distribution of the pixel units on the liquid crystal panel 137 to match the distribution of the pixel units.

The liquid crystal panel 137 is a reflective type panel, and the micro-lens array 136 is positioned such both the light striking the liquid crystal panel 137 and the light reflected from the liquid crystal panel 137 pass through it. When the micro-lens array 136 located at such a position functions as a lens with regard to the reflected light, the reflected light becomes scattered, making a large-diameter projecting optical system 139 necessary, rendering projection impossible as a practical matter. Therefore, it is necessary for the micro-lens array 136 to function as a lens only with regard to the light striking the liquid crystal panel 137. In order to attain this, the materials used for the two cylindrical lens arrays of the projecting image display device 102 are capable of double refraction.

Figure 21A:
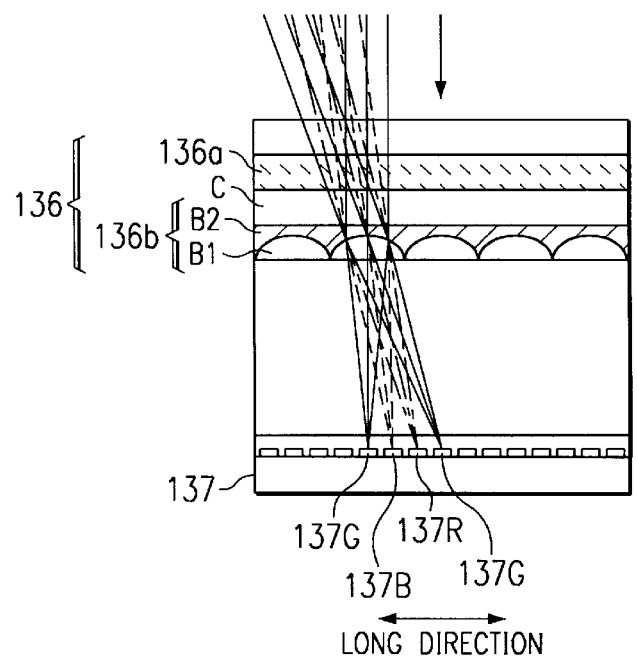
FIGS. 21A–21B are cross-sectional views showing in a simplified fashion the construction of the micro-lens array and the liquid crystal panel of the projecting image display device pertaining to the eleventh embodiment and the operation of the micro-lens array with regard to the light striking the liquid crystal panel.
Figure 21B:
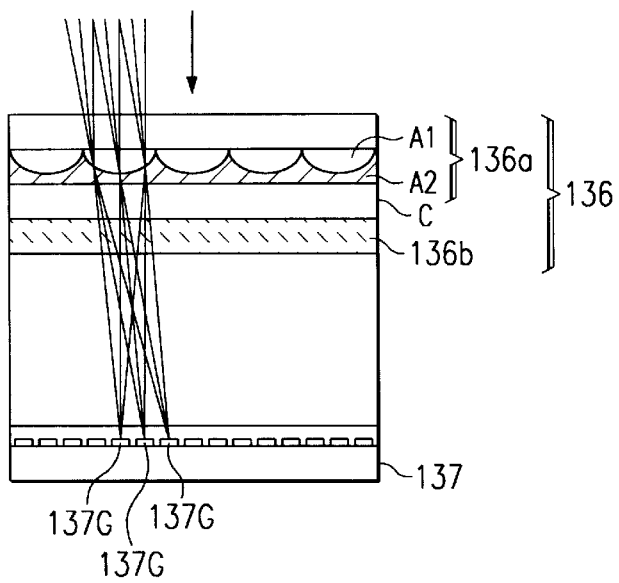
Figure 22A:
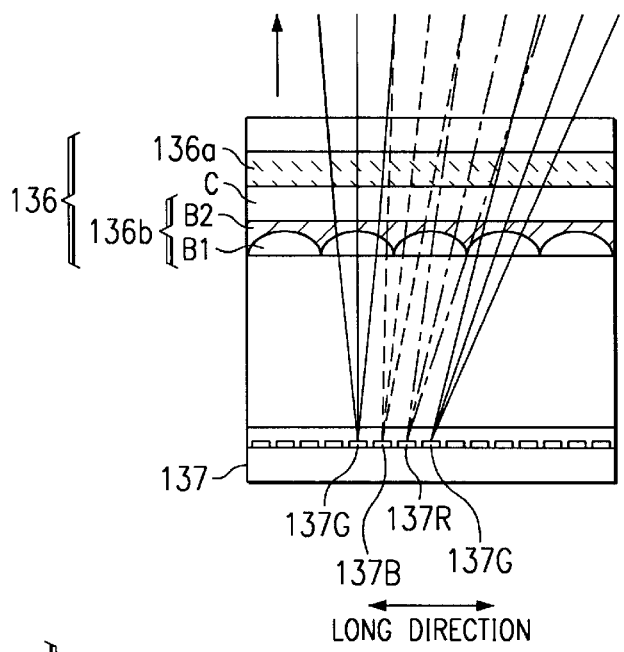
FIGS. 22A–22B are cross-sectional views showing in a simplified fashion the construction of the micro-lens array and the liquid crystal panel pertaining to the eleventh embodiment and the operation of the micro-lens array with regard to the reflected light from the liquid crystal panel.
Figure 22B:
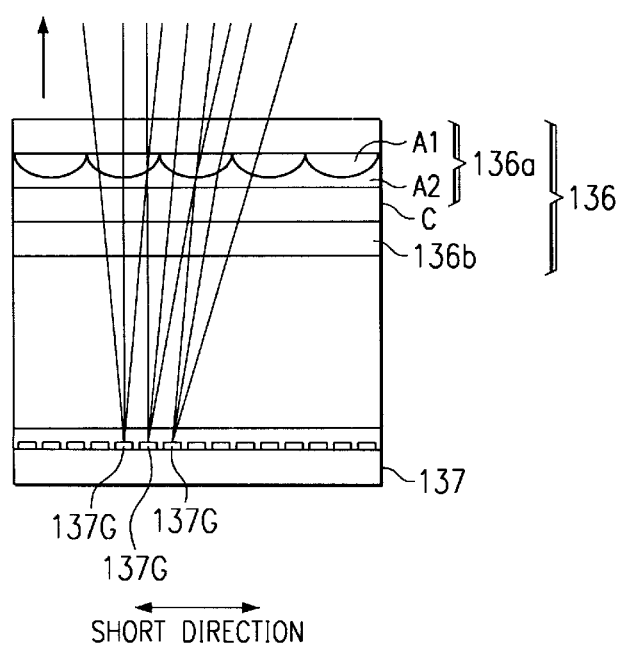
Figure 23:
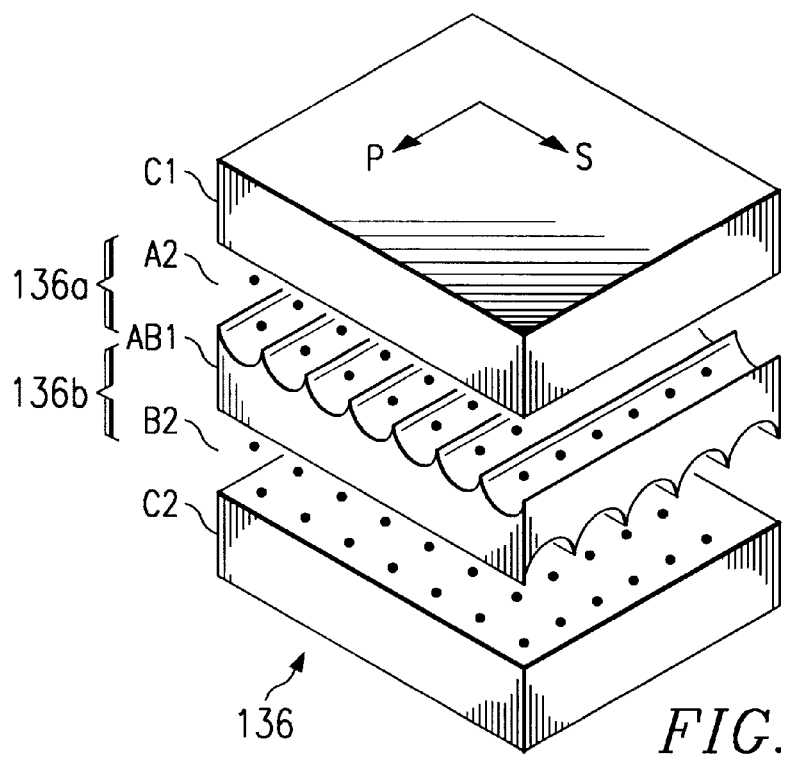
FIG. 23 is a drawing showing another construction of the micro-lens array of the projecting image display device pertaining to the eleventh embodiment.

FIGS. 21A–21B and 22A–22B show in a simplified fashion the constructions of the micro-lens array 136 and the liquid crystal panel 137 and the operation of the micro-lens array 136 with regard to the incident light and the reflected light. FIGS. 21A–21B show the relationship between the micro-lens array 136 and the incoming light striking the liquid crystal panel 137, and FIGS. 22A–22B show the relationship between the micro-lens array 136 and the outgoing light reflected from the liquid crystal panel 137. FIGS. 21A and 22A show a cross-sectional view cut along the long side of the liquid crystal panel 137, while FIGS. 21B and 22B show a cross-sectional view cut along the short side of the liquid crystal panel 137. Reference numbers 137R, 137G and 137B indicate the pixels that modulate the R, G and B light, respectively.

The first cylindrical lens array 136a of the micro-lens array 136 is formed by affixing a medium A1 that does not have a double refraction property to a medium A2 that does have a double refraction property. The second cylindrical lens array 136b is formed by affixing a medium B1 that does not have a double refraction property to a medium B2 that does have a double refraction property. The interface between the medium A1 and the medium A2 comprises the lens array surface having a curvature along the short side of the liquid crystal panel 137, and the interface between the medium B1 and the medium B2 comprises the lens array surface having a curvature along the long side of the liquid crystal panel 137.

The refractive indices of the media A2 and B2 regarding S-polarized light and P-polarized light are different, but the refractive index of the medium A2 regarding P-polarized light is set to be equal to the refractive index of the medium A1 regarding P-polarized light, and similarly, the refractive index of the medium B2 regarding P-polarized light is set to be the same as the refractive index of the medium B1 regarding P-polarized light. The projecting image display device 102 is designed such that the plane of polarization of S-polarized light and the plane of polarization of P-polarized light correspond to the direction in which the short side of the liquid crystal panel 137 extends and the direction in which the long side of the liquid crystal panel 137 extends, respectively.

Therefore, the first cylindrical lens array 136a operates as a lens regarding S-polarized light, and forms images along the short side of the liquid crystal panel 137. The second cylindrical lens array 136b operates as a lens regarding S-polarized light and forms images along the long side of the liquid crystal panel 137. Either the first or second cylindrical lens array 136a or 136b does not operate as a lens regarding P-polarized light.

One cylindrical lens of the first lens array 136a causes the light from light source images that are adjacent along the short side of the liquid crystal panel 137 to form images on the pixels of pixel units that are adjacent along the short side of the liquid crystal panel 137 (FIG. 21B). One cylindrical lens of the second lens array 136b causes the light from light source images that are adjacent along the long side of the liquid crystal panel 137 to form images on the pixels of pixel units that are adjacent along the long side of the liquid crystal panel 137 (FIG. 21A). When this occurs, the light from the light source images is chromatically separated along the long side of the liquid crystal panel 137 and the R, G and B light components form images on the pixels 137R, 137G and 137B, respectively, included in the pixel units.

On the other hand, because the light reflected from the liquid crystal panel 137 is P-polarized light, it passes through the second lens array 136b and the first lens array 136a, traveling straight ahead (FIGS. 22A–22B). The reflected light that passes through the micro-lens array 136 in this matter strikes the projecting optical system 139 with minimal divergence, and therefore, the projecting optical system 139 can have a small diameter.

Any material may be used for the media A2 and B2 that have a double refraction property, but liquid crystal is used in the present embodiment. Various types of liquid crystal having different refractive indices have been developed, and many combinations with the media A1 and B1 are available to obtain different refractive indices. In addition, simply by processing the surfaces of the media A1 and B1 and filling the gaps between these media and the flat panel C with liquid crystal, a micro-lens array 136 may be easily made. Moreover, since narrow cylindrical lens arrays 136a and 136b that have a curvature only in one direction are formed, it is very easy to have uniform alignment of the liquid crystal molecules.

Organic film can also be used as the double refraction material. It may be easily made to adhere to the solid medium by pressing it. It is also possible to ensure uniform alignment of the liquid crystal molecules by injecting an organic monomer between the two solid media and forming the three components into organic film through copolymerization using UV light or heat.

FIGS. 23 through 26 show other constructions of the micro-lens array 136. In the micro-lens array 136 in FIG. 23, concave lens array surfaces are formed on the top and bottom surfaces of a solid medium AB1, flat panels C1 and C2 are situated such that they face either surface of the medium, and liquid crystal is filled into the spaces between the medium AB1 and the flat panels C2 and C2 as the media A2 and B2 having a double refraction property. The media AB1 and A2 comprise the first cylindrical lens array 136a, and the media AB1 and B2 comprise the second cylindrical lens array 136b. The refractive index (Nd) of the medium AB1 is 1.5, the refractive indices of the medium A2 regarding S-polarized light and P-polarized light are 1.7 and 1.5, respectively, and the refractive indices of the medium B2 regarding S-polarized light and P-polarized light are also 1.7 and 1.5, respectively.

Figure 24:
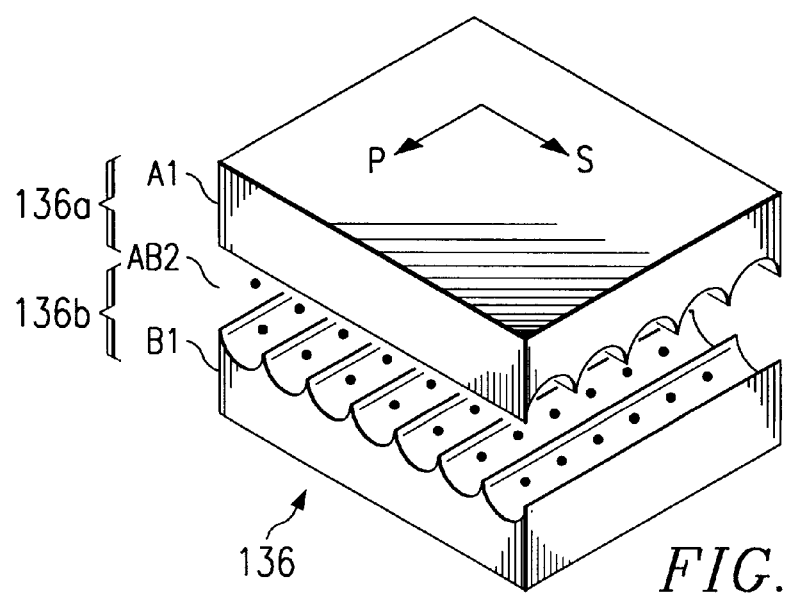
FIG. 24 is a drawing showing yet another construction of the micro-lens array of the projecting image display device pertaining to the eleventh embodiment.

In the micro-lens array 136 in FIG. 24, a solid medium Al having a concave lens array surface formed on its bottom surface and a solid medium B1 having a concave lens array surface formed on its top surface are placed face to face and the spaces between the two media are filled with liquid crystal as the medium AB2 having a double refractive property. The media A1 and AB2 comprise the first cylindrical lens array 136a, and the media B1 and AB2 comprise the second cylindrical lens array 136b. The refractive indices of the media A1 and B1 are both 1.5, and the refractive indices of the medium AB2 regarding S-polarized light and P-polarized light are 1.7 and 1.5, respectively.

Figure 25:
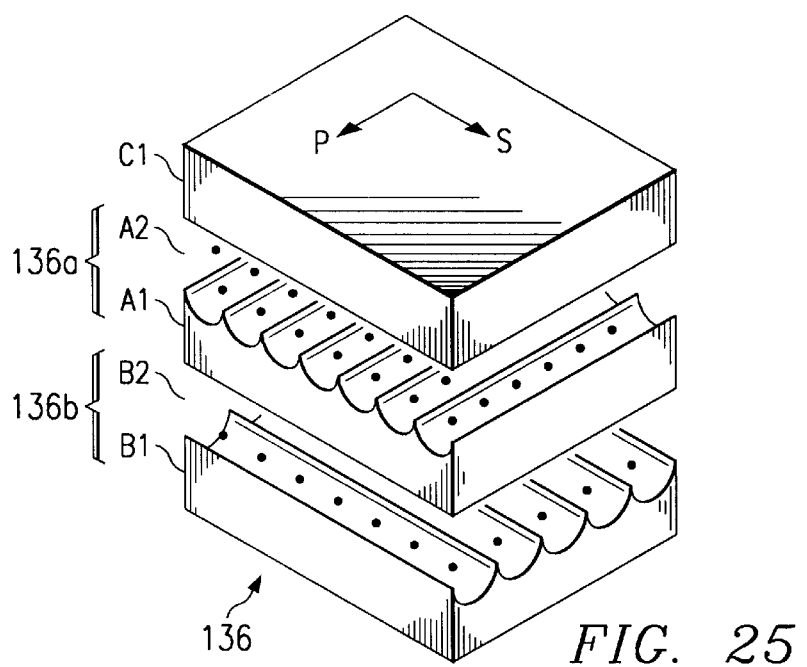
FIG. 25 is a drawing showing yet another construction of the micro-lens array of the projecting image display device pertaining to the eleventh embodiment.

In the micro-lens array 136 in FIG. 25, solid media A1 and B1 having concave lens array surfaces on their top surfaces are placed face to face, a flat panel C1 is placed on top of the top surface of the medium A1, and the spaces created by these three components are filled with liquid crystal as the media A2 and B2 having a double refractive property. The media A1 and A2 comprise the first cylindrical lens array 136*a*1, and the media B1 and B2 comprise the second cylindrical lens array 136*b*. The refractive indices of the media A1 and B1 are both 1.5, and the refractive indices of the media A2 and B2 regarding S-polarized light and P-polarized light are 1.7 and 1.5, respectively.

Figure 26:
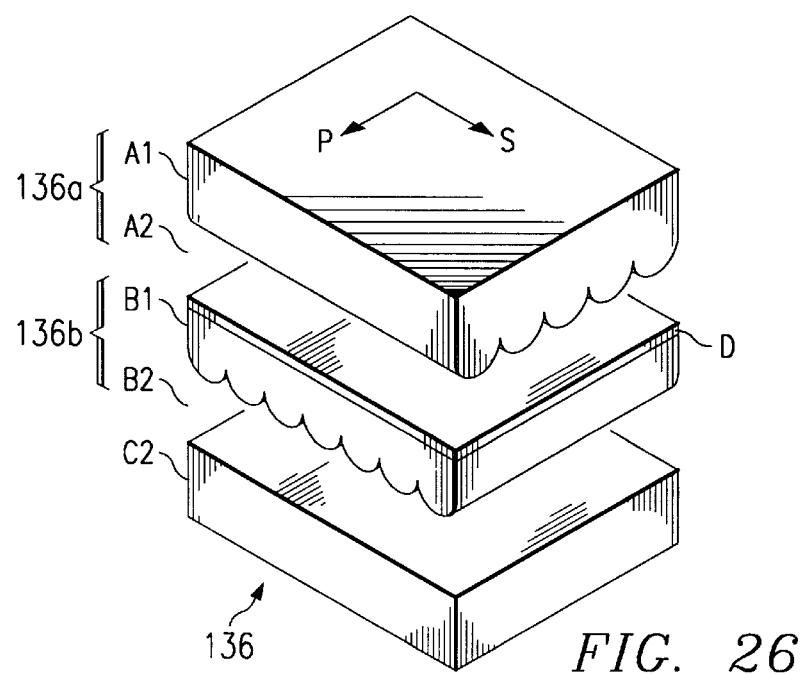
FIG. 26 is a drawing showing yet another construction of the micro-lens array of the projecting image display device pertaining to the eleventh embodiment.

In the micro-lens array 136 in FIG. 26, solid media A1 and B1 having convex lens array surfaces on their bottom surfaces are placed face to face, a flat panel C2 is placed below the medium B1, a half-wavelength plate D is placed on top of the medium B1, and the spaces between the medium A1 and the half-wavelength plate D and between the medium B1 and the flat panel C2 are filled with liquid crystal as the media A2 and B2 having a double refractive property. The media A1 and A2 comprise the first cylindrical lens array 136*a* and the media B1 and B2 comprise the second cylindrical lens array 136*b*. The refractive indices of the media A1 and B1 are both 1.7, the refractive indices of the medium A2 regarding S-polarized light and P-polarized light are 1.5 and 1.7, respectively, and the refractive indices of the medium B2 regarding S-polarized light and P-polarized light are 1.7 and 1.5, respectively.

The S-polarized incident light is converted into P-polarized light after undergoing the lens action of the first lens array 136*a* and passing through the half-wavelength plate D. It then undergoes the lens action of the second lens array 136*b* and strikes the liquid crystal panel 137 not shown in the drawing. The reflected light that was converted into S-polarized light through the modulation performed by the liquid crystal panel 137 progresses straight ahead without undergoing the lens action of the second lens array 136*b*, and after passing through the half-wavelength plate D and being converted into P-polarized light, it progresses straight ahead without undergoing the lens action of the first lens array 136*a*.

The specific refractive indices shown here are only typical examples. As long as the appropriate relationship is maintained between the smaller and larger refractive indices, other indices may be used. In general, the refractive indices of such media as glass, plastic and liquid crystal are in the range of 1.4 to 1.9, and there are many combinations of usable media. Because the focal length of the first and second lens arrays 136*a* or 136*b* is determined based on the curvature of the lens array surface and the refractive index of the medium, a medium having an appropriate refractive index should be selected in consideration of the curvature, or the curvature should be determined based on the refractive index of the medium.

The constructions of the micro-lens array 136 shown in FIGS. 23 through 26 may be used for the projecting image display device 101 of the first embodiment in which a transmission-type liquid crystal panel is used. However, where the micro-lens array 136 is used in combination with a transmission-type liquid crystal panel, it is not necessary to use media having a double refractive property, and therefore, the media A2, B2 and AB2 need not have a double refractive property. In particular, using the construction shown in FIG. 25, the media A2 and B2 may be air. It is also not necessary to use the half-wavelength plate D.

In the projecting image display devices 101 and 102 of the two embodiments described above, the pixel units are aligned along the long side and the short side of the liquid crystal panel using the same pitch, but the alignment pitch ratio for the pixel units may be set freely. In addition, the ratio of the long side length to the short side length of the liquid crystal panel is not limited to 4:3. The focal length for each direction of the micro-lens array should be determined in response to the ratio between the alignment pitches of the pixel units and the ratio between the long side length and the short side length of the liquid crystal panel.

Each embodiment may be applied in a three-panel color image display device that separately modulates the R, G and B light components by means of three liquid crystal panels. In this case, three micro-lens arrays, each of which comprises two cylindrical lens arrays, are used for the liquid crystal panels. In the case of a three-panel system, one pixel comprises one pixel unit, and the distribution of the pixels of each liquid crystal panel should be set in consideration of the quality of the displayed images, such as sharpness, regardless of the ratio between the long side length and the short side length of the liquid crystal panel. On the other hand, the cross-section of the kaleidoscope and the lens cells of the first lens array of the integrator should be similar in shape to the liquid crystal panel, such that the light source images formed may have a distribution matching the ratio between the long side length and the short side length of the liquid crystal panel. These light source images are caused to form images on the liquid crystal panel by means of a micro-lens array having different image forming capabilities for the two directions perpendicular to each other, so that the distribution of the light source images on the liquid crystal panel may match the distribution of the pixels.

The specific values for the various parameters regarding the micro-lens arrays of the projecting image display device of the embodiments will be explained. The values shown below do not necessarily correspond to the projecting image display devices 101 and 102 of the first and second embodiments having liquid crystal panels with a 4:3 ratio between the long side length and the short side length, and includes values for constructions similar to these. In the explanation given below, the terms short side and long side mean the short side and long side of the liquid crystal panel, respectively.

The pitches of the alignment of the light source images formed by a kaleidoscope or integrator in the direction in which the short side extends and in the direction in which the long side extends are deemed a1 and a2, respectively, and the pitches of the alignment of the pixels of the liquid crystal panel (pixel units where a single liquid crystal is used) in the direction in which the short side extends and in the direction in which the long side extends are deemed b1 and b2, respectively. The distances from the light source images formed by a kaleidoscope or integrator to the cylindrical lens array that forms images along the short side and to the cylindrical lens array that forms images along the long side are deemed c1 and c2, respectively, and the distances from the cylindrical lens arrays to the liquid crystal panel are deemed d1 and d2, respectively.

Further, the focal lengths of the cylindrical lens array that forms images along the short side and of the cylindrical lens array that forms images along the long side are deemed f1 and f2, respectively. The radii of curvature of the cylindrical lenses of each cylindrical lens array are deemed r1 and r2, and the differences in the refractive indices of the two media that comprise each cylindrical lens array are deemed <Nd1 and <Nd2. For simplification purposes, c1, c2, d1 and d2 are light path lengths in air.

Here, the following equations hold true.

$$d1 = b1 \times c1/a1$$

$$d2 = b2 \times c2/a2$$

$$f1 = c1 \times d1/(c1+d1)$$

$$f2 = c2 \times d2/(c2+d2)$$

$$r1 = f1 \times <Nd1$$

$$r2 = f2 \times <Nd2$$

In the first numerical example, a1=10.0, a2=15.0, b1=b2=0.03, and c1=100.0. The unit of measurement is millimeters (here and below).
Here, c2=100.1, d1 0.300, d2=0.200, f1=0.299 and f2=0.200 result. Because <Nd1=<Nd2=1.7−1.5=0.2, r=0.060 and r2=0.040 result.

In the second numerical example, the same distance relationships are used as in the first numerical example. Because <Nd1=<Nd2=1.5−1.0=0.5, r1=0.150 and r2=0.100 result.

In the third numerical example, a1=12.0, a2=9.0, b1=b2=0.03, and c1=100.0. Here, c2=99.917, d1=0.250, d2=0.333, f1 0.249, and f2=0.332 result. Because <Nd1=<Nd2 =1.5−1.0=0.5, r1=0.125 and r2=0.166 result.

Cylindrical lenses having these values are easy to form, and the micro-lens arrays may be manufactured with precision.

When using the projecting image display devices of the embodiments described above, it is not necessary to have the light source image forming optical system that forms multiple light source images aligned in a two-dimensional fashion have a function to match the distribution of the light source images that it forms to the distribution of the pixels, and consequently, the light source image forming optical system may have a simple construction. In addition, various liquid crystal panels having different pixel distributions may be used simply by changing the image forming optical system, and therefore it is not necessary to create different light source image optical systems depending on the type of liquid crystal panel is used. Moreover, because the cylindrical lens arrays form images in only one direction, they are easy and efficient to manufacture. Further, when manufacturing various types of projecting image display devices using liquid crystal panels with different pixel distributions, the cost of manufacturing does not increase significantly.

In the construction in which two cylindrical lens arrays of the image forming optical system are formed by affixing face to face two media that have concave grooves, which comprise the lens surfaces, and have low refractive indices, the range of selectable media is large, and the image forming capability of the image forming optical system may be easily set by using not only the lens surface curvatures but also the difference in the refractive indices of the media. In addition, for the medium in the center that has a high refractive index, not only solid media but also liquid media, such as liquid crystal, for example, may be used.

In the construction where a medium that has a double refractive property is added to the two cylindrical lens arrays of the image forming optical system such that the lens action occurs only with regard to light of specified polarization, light modulation by means of a reflective liquid crystal panel is possible, and highly sharp images may be displayed using the characteristics of a reflective liquid crystal panel.

In the projecting image display device in which the light source image forming optical system comprises a rod-like member having a cross-section similar in shape to the liquid crystal panel and multiple light source images are formed by reflecting off the walls of the rod-like member the light from the light source image formed on the end of the rod-like member, the light source image forming optical system is simple, and consequently, the entire device may be made small and lightweight, and the manufacturing cost of the device may be reduced.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

That which is claimed is:

1. An optical apparatus comprising:
   a light source which is capable of generating light of a plurality of colors;
   a display for modulating light from said light source which is incident thereon, said display including a plurality of pixels, each pixel having a height and a width thereof being nonequivalent; and
   a micro lens array for receiving light from said light source, either directly or via another optical element, said micro lens array including a plurality of micro lenses, said micro lenses being positioned to focus a portion of said received light onto said display and at least one of said micro lenses having a different optical power along substantially perpendicular height and width directions.

2. An optical apparatus in accordance with claim 1, wherein a ratio of height to width of said pixels of said display is substantially equal to a ratio of optical power of each micro lens unit along said substantially perpendicular height and width directions.

3. An optical apparatus in accordance with claim 1, further comprising a light color separating device for receiving light from said light source, either directly or via another optical element, and for deflecting light of each of said plurality of colors by a different amount, said light color separating device being disposed between said light source and said micro lens array.

4. An optical apparatus in accordance with claim 3, further comprising an optical device disposed between said light source and said light color separating device for receiving light from said light source and for making substantially uniform an intensity distribution of said light received from said light source and for transmitting light having, a substantially uniform distribution to said light color separating device.

5. An optical apparatus in accordance with claim 4, wherein said optical device for making, substantially uniform an intensity distribution of said light received from said light source is an optical integrator.

6. An optical apparatus in accordance with claim 5, wherein said integrator includes at least two lens arrays, each lens array comprising a plurality of lens cells, lens cells of a first of said at least two lens arrays being aligned in a zigzag fashion.

7. An optical apparatus in accordance with claim 5, wherein said integrator includes at least two lens arrays, each lens array comprising a plurality of lens cells, a second of said lens arrays having a plurality of inclined half mirrors positioned at an exit plane thereof, said half mirrors having a belt configuration, said half mirrors being oriented so as to transmit a portion of light incident thereon and reflect a portion of light incident thereon, said portion of light reflected by one of said half mirrors being directed so as to be incident on another one of said half mirrors.

8. An optical apparatus in accordance with claim 3, wherein said display, said light color separating device and said micro lens array are arranged so that light of each of said plurality of colors is focused onto corresponding portions of said plurality of pixels of said display.

9. An optical apparatus in accordance with claim 3, wherein said a light color separating device is a diffraction grating.

10. An optical apparatus in accordance with claim 3, wherein said a light color separating device comprises a dichroic mirror.

11. An optical apparatus in accordance with claim 4, wherein said optical device for making substantially uniform an intensity distribution of said light received from said light source is a kaleidoscope.

12. An optical apparatus in accordance with claim 11, wherein said kaleidoscope is positioned so as to receive light from said light source at a position offset from a center of a light entry plane of said kaleidoscope.

13. An optical apparatus in accordance with claim 4, wherein said optical device for making substantially uniform an intensity distribution of said light received from said light source comprises a two-tier integrator, each tier including two lens arrays, a lens element in said lens arrays of a first tier being smaller than a lens element in said lens arrays of a second tier.

14. An optical apparatus in accordance with claim 4, further comprising a projecting optical system for receiving light modulated by said display and for projecting the light modulated by said display.

15. An optical apparatus in accordance with claim 1, wherein said display is a liquid crystal panel.

16. An optical apparatus in accordance with claim 1, wherein said display is a digital micromirror device.

17. An optical apparatus in accordance with claim 1, wherein each of said micro lens units is separated from others of said micro lens units by a half-mirror, said half-mirror being oriented substantially parallel to an optical axis of said micro lens unit.

18. An optical apparatus in accordance with claim 1, wherein each of said micro lens units is separated from others of said micro lens units by an air gap, said air gap being oriented substantially parallel to an optical axis of said micro lens unit.

19. An optical apparatus in accordance with claim 1, wherein said micro lens array includes a first plurality of substantially parallel cylindrical lens elements and a second plurality of substantially parallel cylindrical lens elements, said first plurality of lens elements being oriented substantially perpendicular to an orientation of said second plurality of lens elements, a spacing pitch of said first plurality of lens elements being different than a spacing pitch of said second plurality of lens elements of said micro lens array.

20. An optical apparatus in accordance with claim 19, wherein a ratio of height to width of said pixels of said display is substantially equal to a ratio of said pitch of said first plurality of lens elements to said pitch of said second plurality of lens elements.

21. An optical apparatus in accordance with claim 1 wherein at least one of the micro lenses produces a focused light spot on the display the focused light spot having a major axis and a minor axis, the major axis being larger than the minor axis, and wherein the major axis is perpendicular to the greater of the height and width of the pixels.

22. An optical apparatus comprising:
a light source which is capable of generating light of a plurality of colors;
a display for modulating light from said light source which is incident thereon, said display including a plurality of pixels, for each pixel, a height and a width thereof being nonequivalent; and
a micro lens array, disposed between said light source and said display, for receiving light from said light source, either directly or via another optical element, and for focusing a portion of said received light onto said display, said micro lens array including a first plurality of substantially parallel cylindrical lens elements and a second plurality of substantially parallel cylindrical lens elements, said first plurality of lens elements being oriented substantially perpendicular to an orientation of said second plurality of lens elements, a spacing pitch of said first plurality of lens elements being different than a spacing pitch of said second plurality of lens elements of said micro lens array.

23. An optical apparatus in accordance with claim 22, wherein a ratio of height to width of said pixels of said display is substantially equal to a ratio of said pitch of said first plurality of lens elements to said pitch of said second plurality of lens elements.

24. An optical apparatus in accordance with claim 23, wherein said pitch of said first plurality of lens elements is substantially equal to said height of said pixels of said display and said pitch of said second plurality of lens elements is substantially equal to said width of said pixels of said display.

25. An optical apparatus in accordance with claim 22, further comprising a light color separating device for receiving light from said light source, either directly or via another optical element, and for deflecting light of each of said plurality of colors by a different amount, said light color separating device being disposed between said light source and said micro lens array.

26. An optical apparatus in accordance with claim 22, wherein the micro lens array produces a plurality of focused light spots on the display, the focused light spots having a major axis and a minor axis, the major axis being larger than the minor axis, and wherein the major axis is perpendicular to the greater of the height and width of the pixels.

27. An optical apparatus comprising:
a light source which is capable of generating light of a plurality of colors;
a light color separating system for receiving light from said light source, either directly or via another optical element, and for deflecting light of each of said plurality of colors along separate optical paths;
a plurality of displays, one display for each of said plurality of separated colors, for modulating light from said light color separating device which is incident thereon, said display including a plurality of pixels, for each pixel, a height and a width thereof being nonequivalent; and
a plurality of micro lens arrays, one micro lens array being disposed between said light color separating device and each of said displays, each micro lens array being for receiving light separated by said light color separating device and for focusing a portion of said received light onto a corresponding display, each micro lens array including a first plurality of substantially parallel cylindrical lens elements and a second plurality of substantially parallel cylindrical lens elements, said first plurality of lens elements being oriented substantially perpendicular to an orientation of said second plurality of lens elements, a spacing pitch of said first plurality of lens elements being different than a spacing pitch of said second plurality of lens elements of said micro lens array.

28. An optical apparatus in accordance with claim 27, further comprising a color light combining element for receiving light modulated by the plurality of displays and for combining said light modulated by the plurality of displays into a combined polychromatic light beam.

29. An optical apparatus in accordance with claim 28, wherein said light combining element comprises a cross dichroic prism.

30. An optical apparatus in accordance with claim 28, further comprising a projecting optical system for projecting the polychromatic light beam.

31. An optical apparatus in accordance with claim 27, wherein said light color separating system includes at least one dichroic mirror and one full reflecting mirror.

32. An optical apparatus in accordance with claim 27, wherein said light color separating system includes a cross dichroic mirror.

33. An optical apparatus in accordance with claim 27, wherein at least one of the plurality of micro lens arrays produces a plurality of focused light spots on one of the plurality of displays, the focused light spots having a major axis and a minor axis, the major axis being larger than the minor axis, and wherein the major axis is perpendicular to the greater of the height and width of the pixels.

34. An optical apparatus comprising:
a light source which is capable of generating light of a plurality of colors;
a display for modulating light from said light source which is incident thereon, said display including a plurality of pixels, said display including a plurality of pixels, for each pixel, a height and a width thereof being non equivalent; and
a micro lens array, disposed between said light source and said display, for receiving light from said light source, either directly or via another optical element, and for focusing a portion of said received light onto said display, said micro lens array including a first plurality of substantially parallel cylindrical lens elements and a second plurality of substantially parallel cylindrical lens elements, said first plurality of lens elements being oriented substantially perpendicular to an orientation of said second plurality of lens elements, a spacing pitch of said first plurality of lens elements being substantially the same as a spacing pitch of said second plurality of lens elements of said micro lens array, an optical power of each lens element of said first plurality of lens elements being different than an optical power of each lens element of said second plurality of lens elements.

35. An optical apparatus in accordance with claim 34, wherein a ratio of height to width of said pixels of said display is substantially equal to a ratio of said optical power of each lens element of said first plurality of lens elements to said optical power of each lens element of said second plurality of lens elements.

36. An optical apparatus in accordance with claim 34, further comprising, a light color separating device for receiving light from said light source, either directly or via another optical element, and for deflecting light of each of said plurality of colors by a different amount, said light color separating device being disposed between said light source and said micro lens array.

37. An optical apparatus in accordance with claim 34, wherein the micro lens array produces a plurality of focused light spots on the display, the focused light spots having a major axis and a minor axis, the major axis being larger than the minor axis, and wherein the major axis is perpendicular to the greater of the height and width of the pixels.

38. An optical apparatus comprising:
a light source which is capable of generating light of a plurality of colors;
a reflective display for receiving light from said light source, for modulating said light to provided modulated light and for reflecting said modulated light, said display including a plurality of pixels, for each pixel, a height and a width thereof being nonequivalent; and
a micro lens array, disposed between said light source and said display, including a plurality of micro lens units, for receiving received light from said light source and for focusing a portion of said received light onto said display, an optical power of each micro lens unit being different along substantially perpendicular height and width directions.

39. An optical apparatus in accordance with claim 38, further comprising a light color separating device for receiving light from said light source, either directly or via another optical element, and for deflecting light of each of said plurality of colors by a different amount, said light color separating device being disposed between said light source and said micro lens array and providing said received light to said micro lens array.

40. An optical apparatus in accordance with claim 39, wherein said light color separating device is a dichroic prism.

41. An optical apparatus in accordance with claim 40, wherein said dichroic prism is adapted to receive said received light from said light source and to deflect said received into component light of each of said plurality of colors by a different amount, said dichroic prism being further adapted to receive modulated light which is modulated and reflected by said display and to transmit said modulated light from said display without deflecting said modulated light into component modulated light of each of said plurality of colors by a different amount.

42. An optical apparatus in accordance with claim 39, further comprising an optical device disposed between said light source and said light color separating device for receiving light from said light source and for making substantially uniform an intensity distribution of said light received from said light source and for transmitting light having a substantially uniform distribution to said light color separating device.

43. An optical apparatus in accordance with claim 38, wherein a ratio of height to width of said pixels of said display is substantially equal to a ratio of optical power of each micro lens unit along said substantially perpendicular height and width directions.

44. An optical apparatus in accordance with claim 38, wherein said micro lens array includes a birefringent material so that said micro lens array has an optical power for light received from said light source so as to be capable of focusing a portion of said received light onto said display and said micro lens array has substantially zero optical power for light incident thereon which is reflected from said display.

45. An optical apparatus in accordance with claim 38, wherein the micro lens units produce a focused light spot on the display, the focused light spot having a major axis and a minor axis, the major axis being larger than the minor axis, and wherein the major axis is perpendicular to the greater of the height and width of the pixels.

* * * * *